United States Patent
Mallet

(10) Patent No.: US 9,548,940 B2
(45) Date of Patent: Jan. 17, 2017

(54) MASTER ELECTION AMONG RESOURCE MANAGERS

(71) Applicant: Apple Inc., Cupertino, CA (US)

(72) Inventor: Vincent Mallet, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 14/296,790

(22) Filed: Jun. 5, 2014

(65) Prior Publication Data

US 2014/0365661 A1 Dec. 11, 2014

Related U.S. Application Data

(60) Provisional application No. 61/832,920, filed on Jun. 9, 2013.

(51) Int. Cl.
| | |
|---|---|
| *G06F 15/173* | (2006.01) |
| *H04L 12/911* | (2013.01) |
| *H04L 12/917* | (2013.01) |
| *G06F 9/50* | (2006.01) |

(52) U.S. Cl.
CPC ............. *H04L 47/70* (2013.01); *G06F 9/5061* (2013.01); *H04L 47/76* (2013.01); *G06F 2209/505* (2013.01)

(58) Field of Classification Search
CPC ......... H04L 47/70; H04L 47/76; G06F 9/5061
USPC ................................................ 709/223, 226
See application file for complete search history.

(56) References Cited

U.S. PATENT DOCUMENTS

| | | | | |
|---|---|---|---|---|
| 7,116,679 | B1 * | 10/2006 | Ghahremani | H04L 12/5695 370/389 |
| 7,822,862 | B2 * | 10/2010 | Slater | G06F 11/3433 709/203 |
| 8,375,001 | B2 | 2/2013 | San Martin Arribas et al. | |
| 8,392,482 | B1 | 3/2013 | McAlister et al. | |
| 2004/0010544 | A1 * | 1/2004 | Slater | G06F 11/3433 709/203 |
| 2004/0047354 | A1 * | 3/2004 | Slater | H04L 41/0896 370/400 |
| 2007/0234116 | A1 * | 10/2007 | Yoshikawa | G06F 11/2007 714/13 |
| 2012/0303594 | A1 | 11/2012 | Mewhinney et al. | |
| 2012/0303999 | A1 | 11/2012 | Calder et al. | |
| 2013/0042140 | A1 | 2/2013 | Bhogal et al. | |

* cited by examiner

*Primary Examiner* — Kristie Shingles
(74) *Attorney, Agent, or Firm* — Downey Brand LLP

(57) ABSTRACT

The invention provides a technique for assigning a server to manage resources. The server identifies a capacity value that represents a maximum number of resources that the server can simultaneously manage, and parses data included in a tracker directory to identify the resources that have the fewest number of servers assigned to manage them. Next, based on the capacity value, the server registers to manage the identified resources, where each registration to manage an identified resource results in the server actively managing the resource when no other server is registered to manage the resource, or acting as a backup manager to the resource when at least one other server is registered to manage the resource, and the tracker directory is updated accordingly. Finally, the server, for each registration that results in actively managing a resource, configures itself to process client device requests that are directed to utilizing the resource.

26 Claims, 17 Drawing Sheets

MASTER ELECTION AMONG RESOURCE MANAGERS

CROSS-REFERENCE TO RELATED APPLICATIONS

The present application claims the benefit of U.S. Provisional Application No. 61/832,920, entitled "MASTER ELECTION AMONG RESOURCE MANAGERS" filed Jun. 9, 2013, the content of which is incorporated herein by reference in its entirety for all purposes.

TECHNICAL FIELD

The invention relates generally to computing devices. More particularly, embodiments of the invention relate to a technique for conducting a master election among resource managers.

BACKGROUND

The proliferation of client computing devices—such as smart phones and tablets—has drastically changed the manner in which software applications are designed and executed. Some software applications—such as games—are designed to run independently on client computing devices and require little or no interaction with a server. Other software applications—such as photo sharing applications—rely on accessing server computing devices that are designed to interact with the software applications. Notably, implementing and managing such server computer devices can be complicated and expensive, and often exceeds the resources that are available to the average developer. To address this problem, "cloud computing" services were created, which provide scalable computing resources that remove the necessity for a developer to implement his or her own server computing devices.

Notably, existing approaches used to implement and manage cloud computing services are quite complex and require considerable overhead, especially when seeking to meet customer demands for both high availability and high scalability. First, high availability represents a system design approach that guarantees that a particular portion of servers and databases (e.g., 75%) are always functioning properly and online. This typically requires system administrators to be physically onsite to swap out ill-functioning hardware, which is expensive and susceptible to shortcomings and human error. Next, high scalability represents a system design approach that enables the number of servers and databases to dynamically increase or decrease in number. This typically involves system administrators upgrading hardware and updating a configuration that defines the hierarchy and structure of the system—which, similar to the high-availability issues described above—is susceptible to shortcomings and human error.

SUMMARY

Accordingly, embodiments of the invention set forth a new technique for implementing a computing system that possesses both high-availability and high-scalability while requiring very little or no system administrator interaction.

One embodiment of the invention sets forth a method for assigning a server to manage resources. During an initialization of the server, the server identifies a capacity value that represents a maximum number of resources that can be simultaneously managed. Next, the server parses data included in a tracker directory to identify the resources that have the fewest number of servers assigned to manage them. Based on the capacity value, the server registers to manage the identified resources, where each registration to manage an identified resource results in the server actively managing the resource when no other server is registered to manage the resource, or acting as a backup manager to the resource when at least one other server is registered to manage the resource. In turn, the server updates the tracker directory to reflect the registrations so that other servers can obtain a snapshot of the new registrations that have occurred. Next, the server configures itself to receive and process client device requests that are directed to utilizing any resource that the server is actively managing.

Another embodiment of the invention sets forth a method for managing resource requests received from client devices. The method is carried out by a front-end server that is disposed between the client devices and the servers described above, and includes parsing a plurality of resource directories, where each resource directory includes a master file that indicates a server that is configured to actively manage a resource to which the resource directory corresponds. The front-end server stores information about the server indicated by each master file, and configures itself to receive resource requests issued by client devices (e.g., smart phones), where the resource request indicates a particular resource and a utilization of the resource. In response to the request, the front-end server references the stored information to identify the server that is configured to actively manage the particular resource indicated by the resource request, and then forwards the request to the identified server for processing.

Another embodiment of the invention sets forth a non-transitory computer readable storage medium storing instructions that, when executed by a processor, cause the processor to implement any of the methods described above. Yet another embodiment of the invention sets forth a system that includes components configured to implement any of the method steps described above.

Another embodiment of the invention sets forth a method of assigning servers to resources on which processing tasks are to be performed. The method includes, in response to initialization of a resource server, determining whether the resource server has available capacity, wherein the server has available capacity when at least one server partition slot is not assigned to any partitions, and the partitions are selected from a defined set of partitions, each partition corresponds to a defined set of resources, and each server partition slot represents a capacity of the server to process tasks in one partition. The method further includes identifying a set of one or more unassigned partitions that are not assigned to a respective master server, and, when the resource server has available capacity and there is at least one unassigned partition, attempting to assign the resource server to a limited number of the set of unassigned partitions, wherein a first server assigned to a partition is a master server for the partition, and a second and subsequent servers assigned to the partition are backup servers for the partition. The method further includes repeating the determining, identifying, and attempting to assign until the server has no available capacity or there are no unassigned partitions, and, in response to detecting failure of a master server, promoting one of the backup servers associated with the partition to be the master server for the partition.

One or more embodiments of the invention can include one or more of the following features. The method can include requesting a notification to be generated when the server partition map is modified, and, in response to the notification, determining whether a server has been removed from the map, and, in response to determining that a server has been removed from the map, repeating the determining, identifying, and attempting to assign until the server has no available capacity or there are no unassigned partitions. In the method, attempting to assign the resource server to a limited number of the set of unassigned partitions can include randomly selecting a set of partitions from the one or more unassigned partitions, wherein the number of partitions in the second set is limited to a specified maximum number of partitions, and attempting to assign the partitions in the set to the resource server. The method can include retrieving, from a shared data store, a list of partition masters and corresponding partitions to which the masters are assigned, where identifying a set of one or more unassigned partitions includes determining whether there are one or more unassigned partitions in the list of partition masters, and the one or more unassigned partitions are not assigned to any resource servers. In the method, attempting to assign the resource server to a limited number of the set of unassigned partitions can include requesting that entries associating each partition with the resource server be stored in the data store. Determining that the server has no available capacity can include querying the data store for mappings from the server to partitions, and the server can be assigned by the mappings to a maximum number of partitions. Determining that there are no unassigned partitions can include querying the data store for partitions, and determining whether the data store contains mappings to all partitions in the defined set of partitions. The method can include retrieving an updated list of partition masters and corresponding partitions from the shared data store, determining, based upon the updated list, a number of servers assigned to each partition, and sorting the partitions in the updated list by number of servers corresponding to each partition.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

DETAILED DESCRIPTION

Figure 1A:
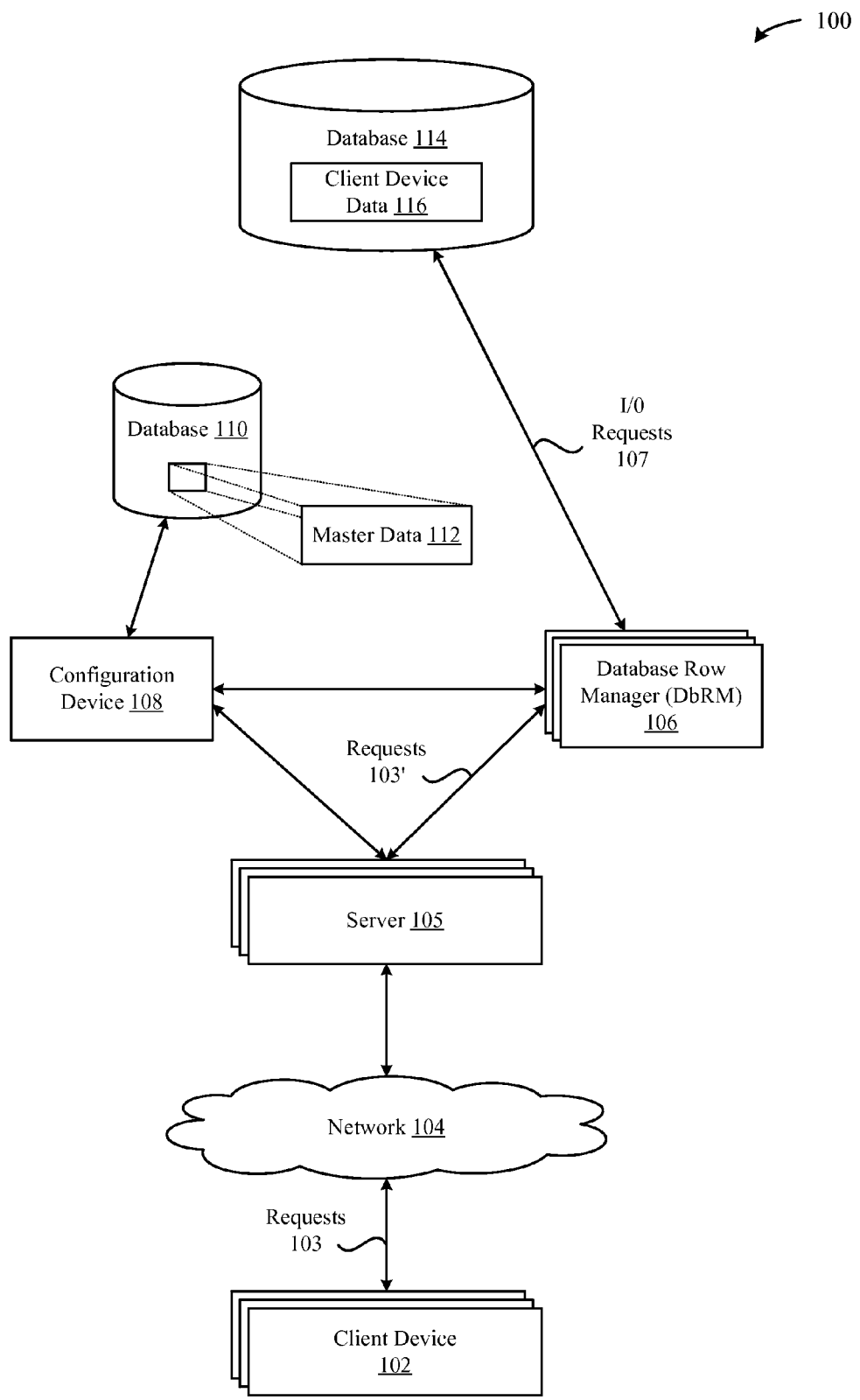
FIGS. 1A-1B illustrate block diagrams of a computer system configured to implement the various embodiments of the invention.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described above, embodiments of the invention enable a computing system to exhibit high-availability and high-scalability while requiring little or no system administrator interaction. According to one embodiment, the computing system includes a database that is segmented into partitions, one or more database row manager devices (DbRMs) configured to manage the partitions, and a configuration device that facilitates how and when the DbRMs assign themselves to manage the partitions. In particular, each DbRM has a pre-defined capacity that represents a threshold number of partitions (e.g., sixteen partitions) that the DbRM can simultaneously and reliably manage, and is configured to, via the configuration device, act as either a "master" manager or a "candidate" manager to one or more of the partitions included in the database. Each DbRM is also configured to provide a heartbeat to the configuration device so that the configuration device can maintain an up-to-date snapshot of the DbRMs that are online and functioning properly. The heartbeat also enables the configuration device to detect when a DbRM goes offline and no longer acts as a master manager of one or more (unmanaged) partitions included in the database. When this occurs, each DbRM that is assigned as candidate manager to any of the one or more unmanaged partitions determines if a transition can successfully be made from being the candidate manager to the master manager, and, if so, becomes the master. In this manner, candidate managers are capable of immediately taking over and becoming master managers of temporarily unmanaged partitions so partitions do not go unmanaged for unreasonable amounts of time (e.g., more than a few milliseconds or seconds).

Embodiments of the invention also enable the configuration device to trigger the DbRMs to rebalance the manner in which they manage the partitions within the database. The rebalance can be triggered by, for example, issuing to the DbRMs a rebalance notification when a particular condition is met. Specifically, when the rebalance trigger occurs, the configuration device issues a rebalance notification to each of the DbRMs that are in communication with the configuration device. In turn, each DbRM communicates with the configuration device to determine a total number of DbRMs in communication with the configuration device as well as a total number of partitions included in the database. Each DbRM then establishes a temporary capacity that is equivalent to the total number of partitions divided by the total number of DbRMs. Notably, if any DbRM is the master of a current number of partitions that exceeds the temporary capacity, then the DbRM is configured to relinquish itself from being the master of a number of partitions less than or equal to the delta between the current number and the temporary capacity. For example, if a particular DbRM is currently the master of eight partitions, and the temporary capacity is five partitions, then the particular DbRM would relinquish itself from being the master of up to three of the eight mastered partitions. In turn, the DbRMs then communicate with the configuration server and establish new commitments to being master managers and/or candidate managers to the different partitions included in the database. Once the new commitments are established, each DbRM can abandon the temporary capacity and revert back to the pre-defined capacity such that the DbRM transitions back to behaving according to the manner set forth above.

The above sets forth the manner in which the DbRMs, in conjunction with the configuration device, manage the partitions included in the database. Notably, the DbRMs are configured to operate as back-end devices and are not configured to communicate with client devices that require access to the data stored in the partitions. Accordingly, the computing system is also configured to include one or more server devices that act as an interface between the DbRMs and client devices when the client devices issue requests to access the data stored in the partitions. Specifically, each of the server devices interacts with the configuration device to maintain, for each of the partitions, an up-to-date record of the DbRM that is currently assigned as the master manager of the partition. According to this configuration, each server device, upon receipt of a request from a client device, determines the partition to which the request is directed (e.g., via the aforementioned up-to-date records), identifies the DbRM that is the master manager of the partition, and forwards the request to the identified DbRM. In turn, the server device issues a response to the client device as soon as a receipt that the request has been handled is received from the identified DbRM.

Figure 1B:
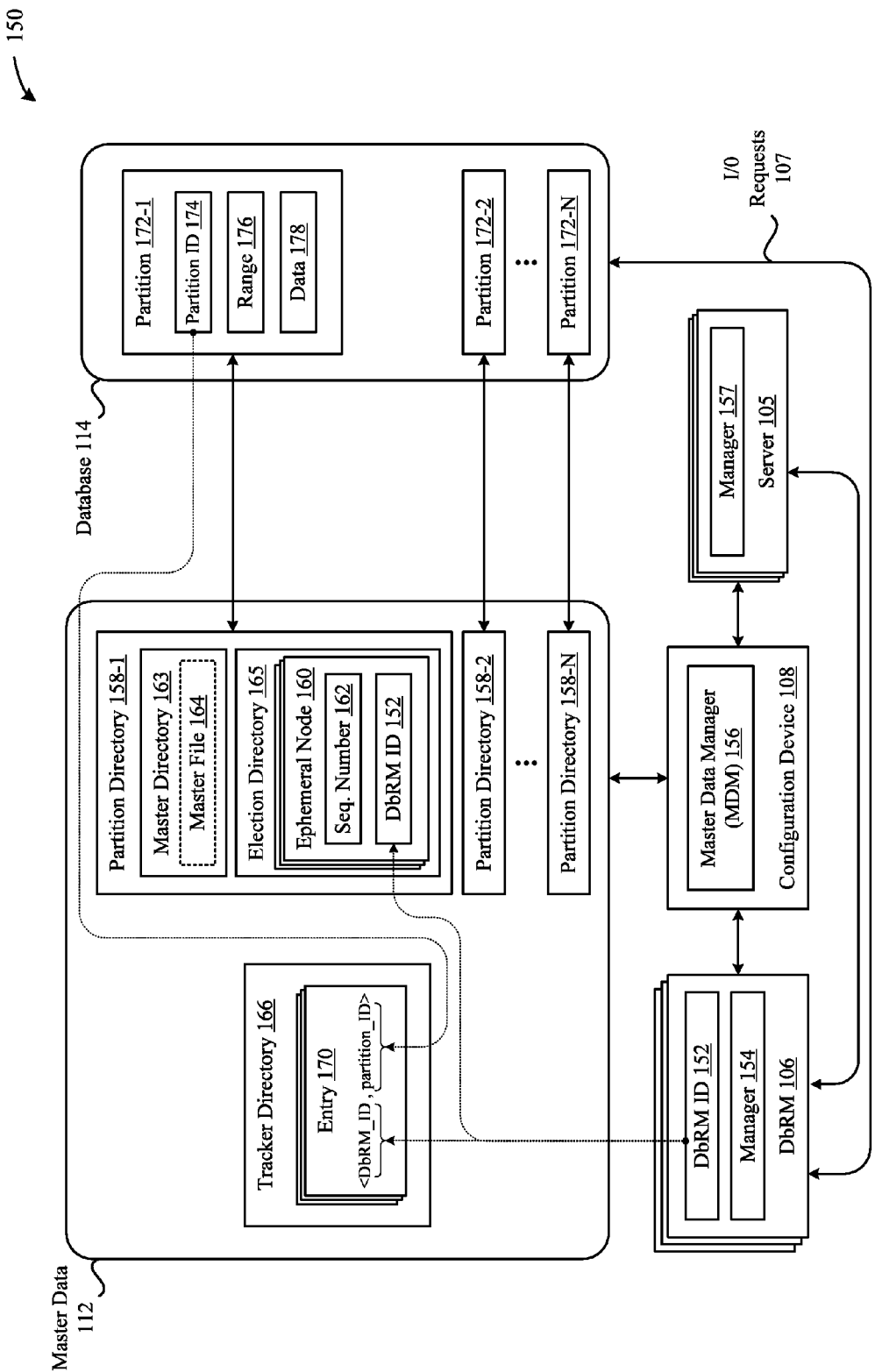

FIGS. 1A-1B illustrate different views of a computer system 100 configured to implement the various embodiments of the invention. More specifically, FIG. 1A illustrates a high-level overview of the computer system 100, which includes client devices 102, servers 105, DbRMs 106, a configuration device 108, a database 110, and a database 114. According to FIG. 1A, the database 114 includes client device data 116, which, as described below in conjunction with FIG. 1B, is stored across one or more database partitions. As shown in FIG. 1A, and according to the techniques described above, both the servers 105 and the DbRMs 106 are configured to communicate (e.g., via a local area network (LAN)) with the configuration device 108. In one embodiment, the configuration device 108 manages a database 110 that stores master allocation data 112, which, as described below in greater detail, is used to facilitate how and when the DbRMs 106 assign themselves to manage the partitions. Notably, this data is also used by the servers 105 to determine the master manager, if any, that is assigned to each of the partitions included in the database 114. In one example, the configuration device 108 can execute the Apache™ ZooKeeper™ software infrastructure to manage the database 110, which stores the master allocation data 112 in data nodes. The nodes are created atomically, so that if two requests are issued concurrently, only one request will succeed, and the other request will fail.

FIG. 1A also illustrates I/O requests 107 that are issued by the DbRMs 106 to the database 114. In particular, the I/O requests 107 are issued in response to requests 103 received by the servers 105 from the client devices 102 via a network 104 (e.g., the Internet). More specifically, each server 105 identifies, for each received request 103, a partition that corresponds to the request 103, and then identifies the DbRM 106 that is assigned as the master manager to the identified partition. When the DbRM 106 is identified, the server 105 forwards the request 103 to the DbRM 106, where the DbRM 106 in turn translates the request 103 into an I/O request 107 that is understood by the database 114. In turn, the database 114 processes the I/O request 107, and issues a response to the DbRM 106, which then forwards the response to the server 105. Finally, the server 105 forwards the response back to the client device 102 that first issued the request 103. Notably, according to this configuration, the client devices 102 are prevented from understanding both the configuration device 108 and the DbRMs 106, which enhances the overall security of the computer system 100 and eliminates the need for all of the client devices 102 to stay up-to-date with the DbRMs 106 to manage where the requests 103 should be issued.

FIG. 1B illustrates a more detailed view 150 of several components included in the computer system 100, according to one embodiment of the invention. For example, FIG. 1B shows that each DbRM 106 includes both a DbRM identification (ID) 152 and a manager 154. The DbRM ID 152 is unique identifier for the DbRM 106 with respect to other DbRMs 106 included in the computer system 100, and the manager 154 is configured to carry out the various functionalities of the DbRM 106 described herein (e.g., communicate with the configuration device 108, receive requests 103 from servers 105, issue I/O requests 107 to the database 114, etc.). The manager 154 is also configured to maintain the capacity that represents the threshold number of partitions that the DbRM 106 can simultaneously and reliably manage. Also shown in FIG. 1B is a master data manager (MDM) 156 included in the configuration device 108, and a manager 157 included in the server 105, which, similar to the manager 154, are configured to carry out the various functionalities of the configuration device 108 and the server 105, respectively.

FIG. 1B further includes a more detailed view of the database 114, which, as shown, includes one or more partitions 172. As shown in FIG. 1B, in one embodiment, each partition 172 includes a partition ID 174, a range 176, and data 178. First, the partition ID 174 uniquely identifies the partition 172 among the other partitions 172 included in the database 114. Next, the range 176 specifies a subset of the database that is represented by the partition, e.g., a range of database rows that comprise the partition. Finally, the data 178 represents the binary information that belongs to the partition—which, as set forth above, is accessed via I/O requests 107 issued by DbRMs 106.

Further shown in FIG. 1B is a more detailed view of the master allocation data 112, which, as shown, includes a tracker directory 166 and a number of partition directories 158 that corresponds to the number of partitions 172 included in the database 114. In particular, the tracker directory 166 can include a plurality of entries 170, where each entry 170 includes a data pair that comprises: 1) a DbRM ID 152 of one of the DbRMs 106, and 2) a partition ID 174 of one of the partitions 172. According to this configuration, each entry 170 identifies a particular DbRM 106 (via the DbRM ID 152) that is assigned to manage a particular partition 172 (via the partition ID 174), either as a master manager or a candidate manager. In this manner, entries 170 can be parsed by DbRMs 106 to identify the partitions 172 that have the fewest number of DbRMs 106 that are assigned to manage them so that the management of the partitions 172 can remain substantially balanced.

Each partition directory includes a master directory 163, which can include a master file 164 (when one has been established). The master file 164 identifies the elected master of the partition 172. In one embodiment, the master file 164 includes information about the DbRM 106 (e.g., a host name and a port number) that is currently the master manager of the partition 172 to which the partition directory 158 corresponds. Notably, the master file 164 is accessible to the servers 105 and provides a way for the servers 105 to keep an-up-to date mapping and efficiently identify, for each partition 172 that stores the client device data 116, the DbRM 106 that is assigned as the master manager to the partition 172.

Each partition directory 158 also includes an election directory 165, which includes one or more "ephemeral" nodes 160. An ephemeral node 160 can be, for example, a data node managed by the configuration device 108 (e.g., using ZooKeeper™) that is associated with a network communication session between ZooKeeper™ and a DbRM 106. If the network communication session is lost, e.g., because the DbRM 106 crashes or loses communication, then ZooKeeper™ notices that heartbeat messages are no longer received from the DbRM 106 and automatically deletes any ephemeral nodes 160 that correspond to the DbRM 106.

In one embodiment, the filename for each ephemeral node 160 includes a sequence number 162 and a DbRM ID 152. The sequence number 162 represents a position in a sequence (e.g., via a dynamically-updated counter value) at which the ephemeral node 160 is generated, and the DbRM ID 152 represents the DbRM 106 that requested the configuration device 108 to create the ephemeral node 160. Notably, each DbRM 106 issues requests to the configuration device 108 to create the ephemeral nodes 160 as opposed to creating them directly within the election directories 165, since the latter approach could potentially result in ephemeral nodes 160 colliding between DbRMs 106 and establishing two or more ephemeral nodes 160 with the same sequence number 162. It is noted that including the sequence number 162 and the DbRM ID152 in the filename of each ephemeral node 160 eliminates the need to access contents of the ephemeral node 160, which significantly increases overall efficiency and performance.

As previously noted herein, each DbRM 106 is configured to periodically issue a heartbeat to the configuration device 108 so that the configuration device 108 is aware that the DbRM 106 is online and functioning properly. The heartbeat of the DbRM 106 can be specifically tied to each of the ephemeral nodes 160 that correspond to the DbRM 106 (via the DbRM ID 152). In one aspect, each ephemeral node 160 that corresponds to a particular DbRM 106 only exists within an election directory 165 when the DbRM 106 regularly issues its heartbeat to the configuration device 108. In other words, when the DbRM 106 goes offline and its heartbeat is no longer received by the configuration device 108, the configuration device 108 eliminates all ephemeral nodes 160 that correspond to the DbRM 106.

As described below in greater detail, when the configuration device 108 eliminates an ephemeral node 160 from an election directory 165 that includes other ephemeral nodes 160, each DbRM 106 that corresponds to one of the other ephemeral nodes 160 included in the election directory 165 is notified, and, in response, determines if its corresponding ephemeral node 160 is now, by way of the removed ephemeral node 160, the earliest-generated ephemeral node 160 included in the election directory 165. Of course, finer-tuned approaches can be implemented, e.g., each DbRM 106 can be configured to be notified by the configuration device 108 only when an ephemeral node 160 most immediate to, e.g., immediately preceding, an ephemeral node 160 that corresponds to the DbRM 106 in the ordering of ephemeral nodes is removed, thereby creating a "cascade" effect. In turn, the DbRM 106 that determines its corresponding ephemeral node 160 is the earliest-generated ephemeral node 160 identifies itself as the new master manager to the partition 172 that corresponds to the partition directory 158. Finally, this DbRM 106 takes the necessary steps to become the master manager of the partition 172, which are described below in greater detail.

Figure 2:
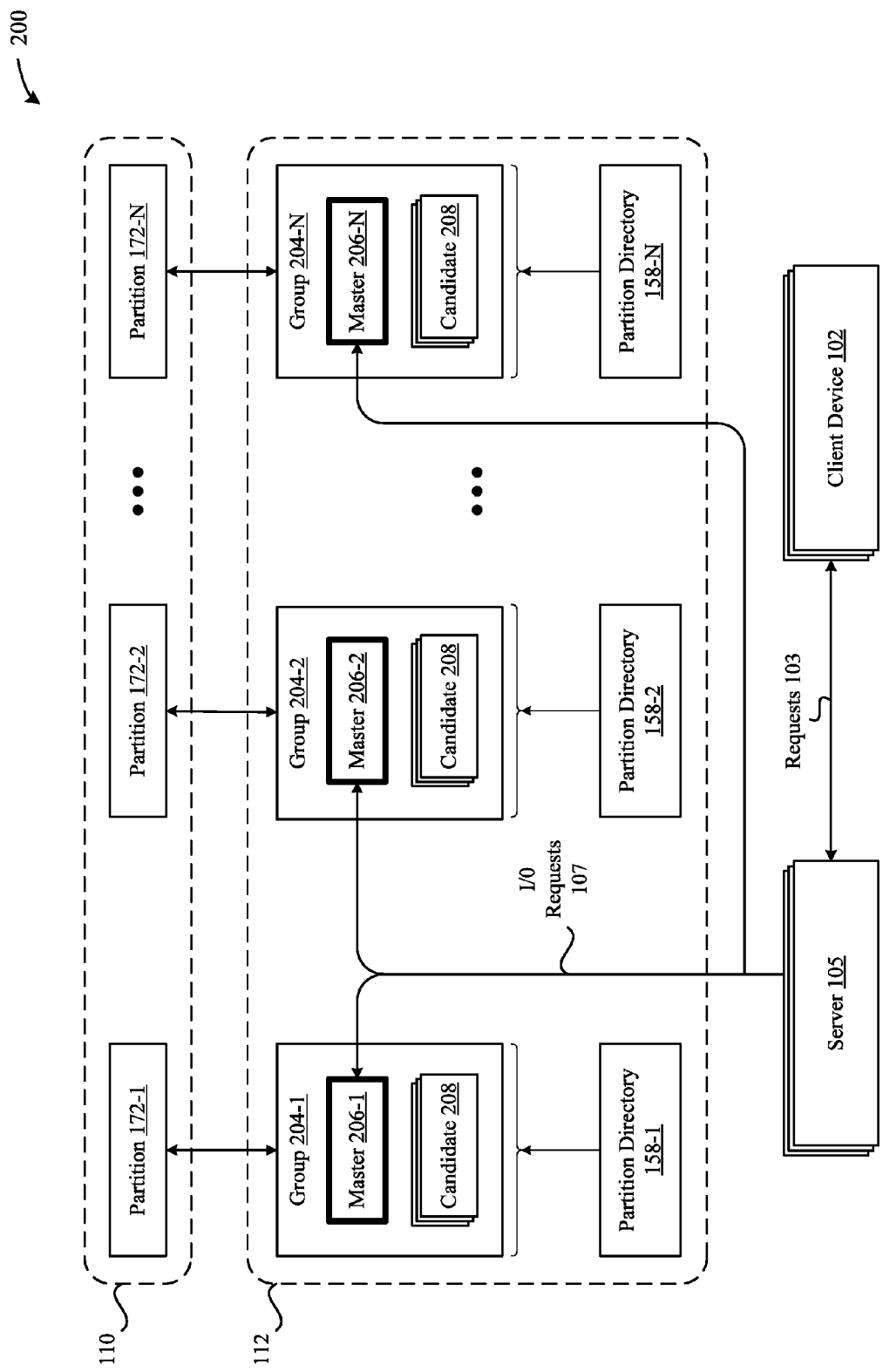
FIG. 2 illustrates a block diagram that depicts the manner in which a partition directory can be used to identify a master database row manager and candidate database row managers that are associated with a partition to which the partition directory corresponds, according to one embodiment of the invention.

FIG. 2 is a block diagram 200 that illustrates the manner in which the contents of a partition directory 158 can be used to identify a master manager (if any) and candidate managers (if any) that are assigned to the partition 172 to which the partition directory 158 corresponds. As shown in FIG. 2, each partition directory 158 can represent a group 204, which includes a master 206 and candidates 208. In particular, the master 206 and the candidates 208 represent the ephemeral nodes 160 included in the election directory 165. For example, if an election directory 165 includes three ephemeral nodes 160, then the group 204 that represents the partition directory 158 includes one master 206 and two candidates 208. In this example, the master 206 represents the earliest-generated ephemeral node 160 included in the partition directory 158 and the two candidates 208 represent the later-generated ephemeral nodes 160. In this example, if the master 206 (i.e., DbRM 106) goes offline, then the next-in-line candidate 208 (i.e., the earliest-generated of the later-generated ephemeral nodes 160) immediately assigns itself to be the new master 206 of the partition 172. When this occurs, the last candidate 208 becomes the next-in-line to become the master 206 when the new master 206 fails. Accordingly, the ephemeral nodes 160 included in an election directory 165 can be processed to identify: 1) the DbRM 106 that is currently assigned as the master 206, and 2) the DbRMs 106 are currently assigned as candidates 208.

Figure 3A:
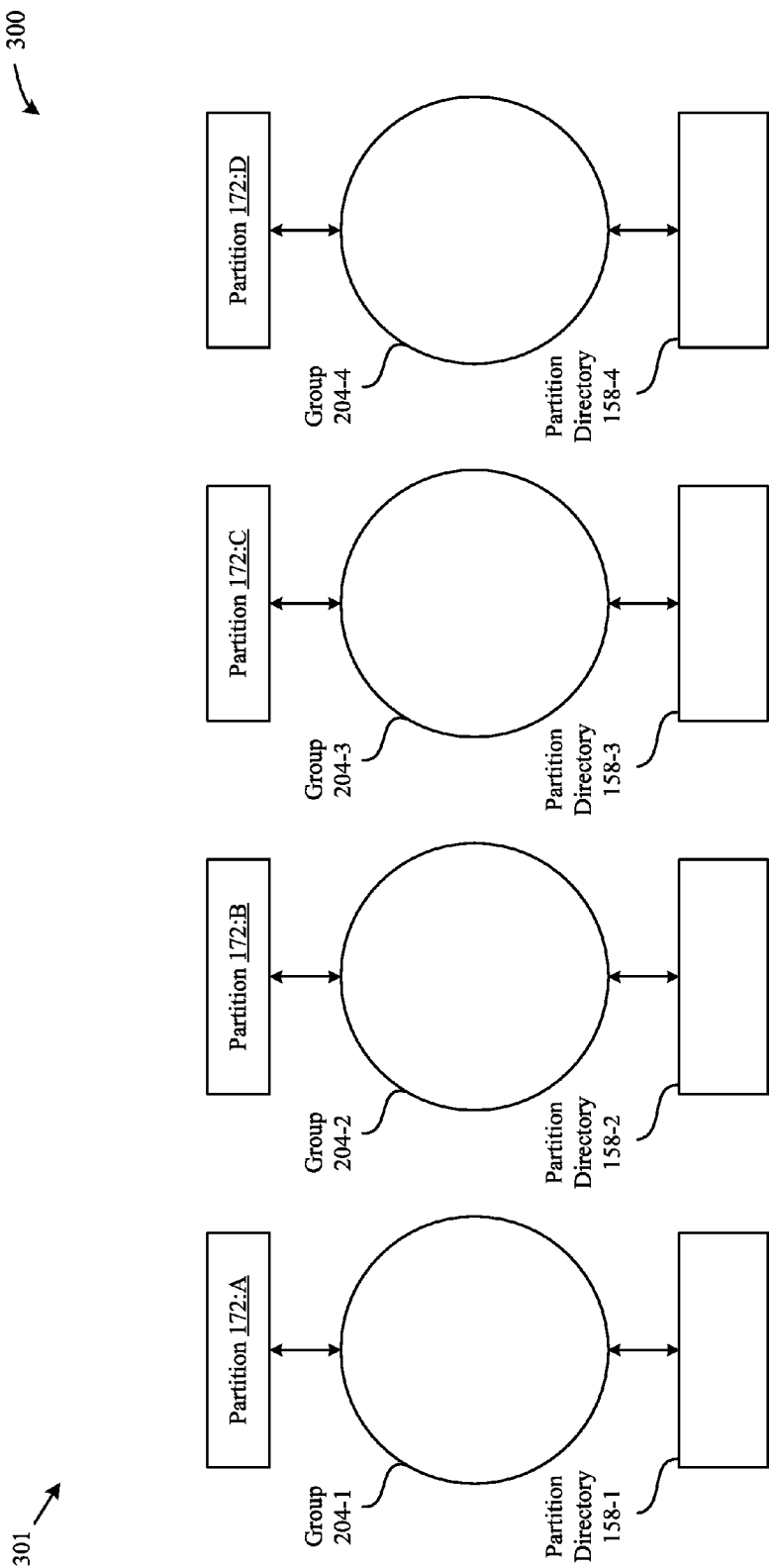
FIGS. 3A-3I illustrate an example sequence that involves four database row managers initializing to manage four database partitions that require management, according to one embodiment of the invention.

FIGS. 3A-3I illustrate conceptual diagrams that show an example sequence 300, which involves four DbRMs 106 initializing within the computer system 100 when the database 114 includes four unmanaged partitions 172 that require management. As shown in FIG. 3A, the sequence 300 begins at step 301, where a DbRM 106 with a DbRM ID 152 of "106:A" and a capacity of managing two partitions 172 comes online and detects that the tracker directory 166 is empty, i.e., no entries 170 are included in the tracker directory 166, which is represented below in Table 1.

TABLE 1

| (Tracker Directory 166) | |
| --- | --- |
| DbRM ID | Partition ID |
| — | — |
| — | — |

TABLE 1-continued (Tracker Directory 166)

| DbRM ID | Partition ID |
|---------|--------------|
| —       | —            |
| —       | —            |
| —       | —            |
| —       | —            |
| —       | —            |

Figure 3B:
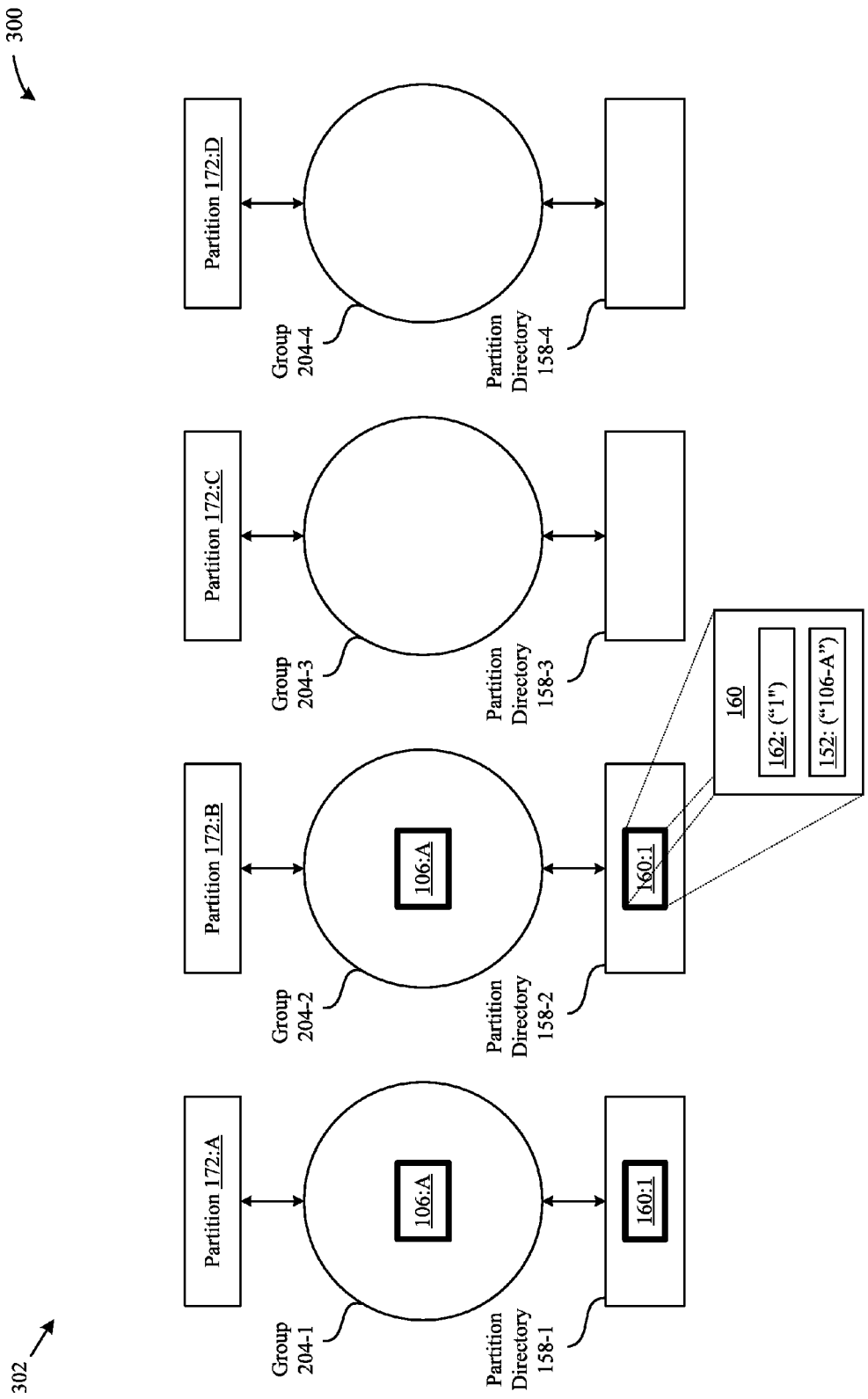

Turning to FIG. 3B, at step 302, the DbRM 106 with the DbRM ID 152 of "106:A", in correlation to having a capacity of managing two partitions 172, requests the configuration device 108 to create an ephemeral node 160 within each of the election directories 165-1 and 165-2 included in the partition directories 158-1 and 158-2, respectively (and further correspond to the groups 204-1 and 204-2, respectively). The resulting two ephemeral nodes 160 can be represented, for example, as follows:

(Election Directory 165) /rm/P158-1/election165-1/106: A$_{\_1}$.node
(Election Directory 165) /rm/P158-2/election165-2/106: A$_{\_1}$.node In this example, the ephemeral nodes 160 include a sequence number 162 of "1" since they are the first ephemeral nodes 160 to be generated within their respective election directories 165-1 and 165-2. Notably, this makes the DbRM 106 with the DbRM ID 152 of "106:A" the master manager of the partitions 172:A and 172:B, since the ephemeral nodes 160 are the earliest-generated nodes within the respective election directories 165-1 and 165-2. Accordingly, the DbRM 106 with the DbRM ID 152 of "106:A" issues a request to the configuration device 108 to create master files 164 within the master directories 163 of the partition directories 158-1 and 158-2, as shown below:

(Master Directory 163) /rm/P158-1/master163-1/RM106: A.file
(Master Directory 163) /rm/P158-2/master163-2/RM106: A.file Next, the DbRM 106 with the DbRM ID 152 of "106:A" requests the configuration device 108 to update the tracker directory 166 to reflect the creation of the ephemeral nodes 160. Notably, this would involve creating two entries 170, which can be represented as nodes as follows:

(Tracker Directory 166) /rm/track166/106:A-172:A.node
(Tracker Directory 166) /rm/track166/106:A-172:B.node These two entries are shown below in Table 2.

TABLE 2

(Tracker Directory 166)

| DbRM ID | Partition ID |
|---------|--------------|
| 106:A   | 172:A        |
| 106:A   | 172:B        |
| —       | —            |
| —       | —            |
| —       | —            |
| —       | —            |

Figure 3C:
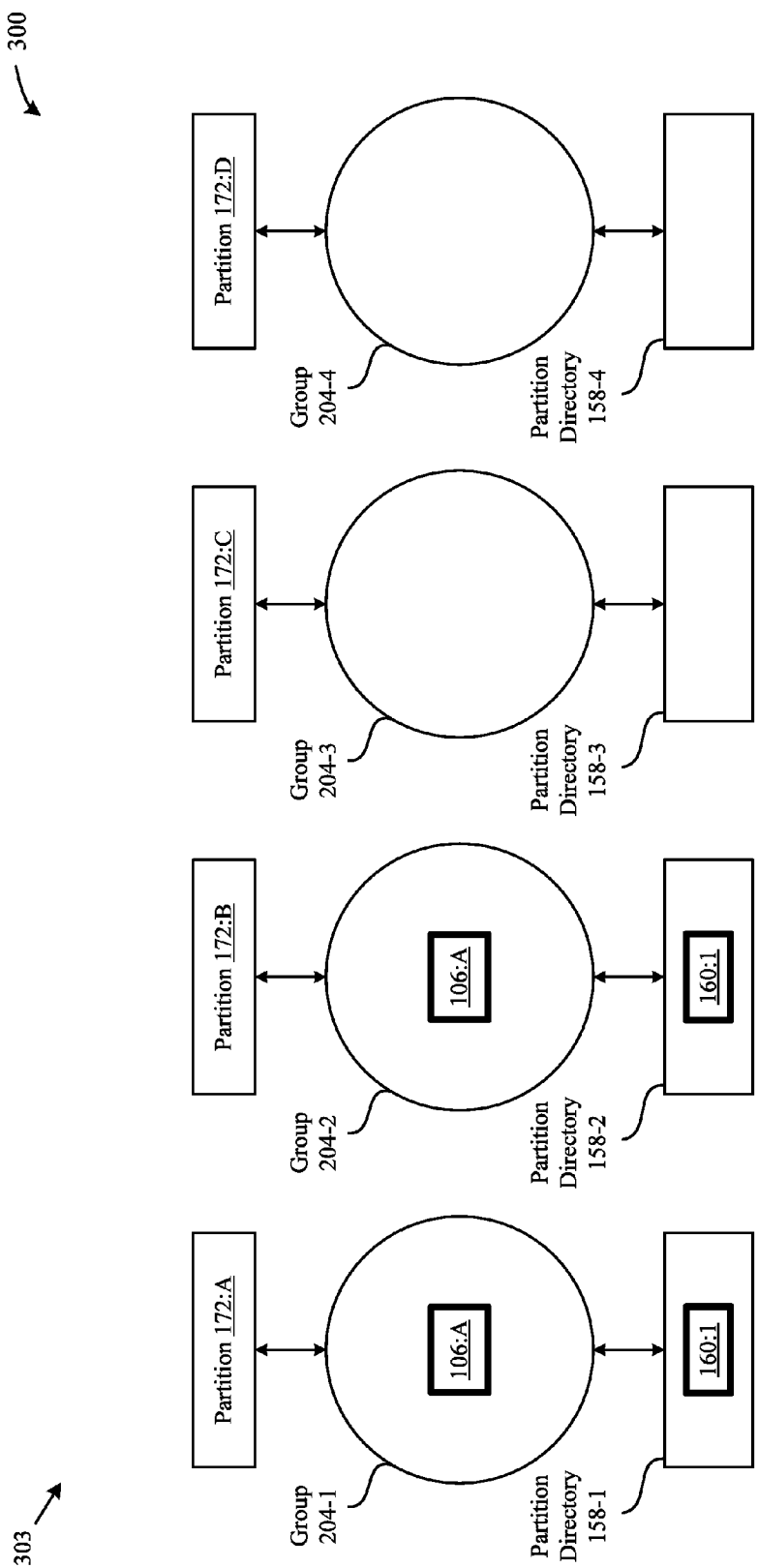
Figure 3D:
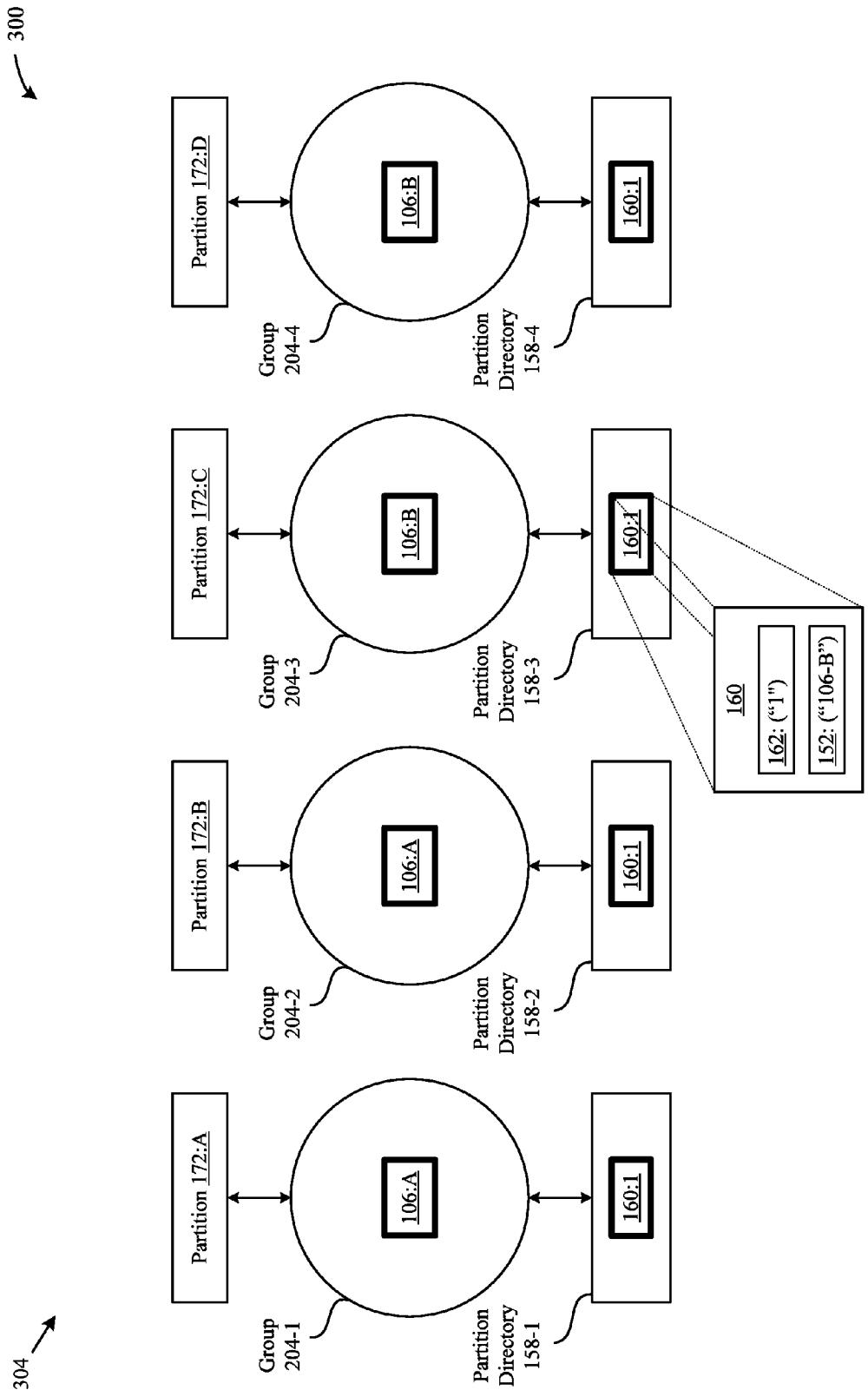

Turning now to FIG. 3C, at step 303, a DbRM 106 with a DbRM ID 152 of "106:B" and a capacity of managing two partitions 172 comes online and detects that the tracker directory 166 includes two entries 170, but that there are four partitions 172 total, leaving two unmanaged. In turn, in FIG. 3D, and at step 304, the DbRM 106 with a DbRM ID 152 of "106:B", in correlation to having a capacity of managing two partitions 172, requests the configuration device 108 to create an ephemeral node 160 within each of the election directories 165-3 and 165-4 that correspond to the groups 204-3 and 204-4, respectively. In this example, the ephemeral nodes 160 include a sequence number 162 of "1" since they are the first ephemeral nodes 160 to be generated within their respective election directories 165-3 and 165-4. Notably, this makes the DbRM 106 with the DbRM ID 152 of "106:B" the master manager of the partitions 172:C and 172:D, since the ephemeral nodes 160 are the earliest-generated nodes within the respective election directories 165-3 and 165-4. Subsequently, the DbRM 106 with a DbRM ID 152 of "106:B" requests the configuration device 108 to update the tracker directory 166 to reflect the creation of the ephemeral nodes 160, which is represented below in Table 3.

TABLE 3

(Tracker Directory 166)

| DbRM ID | Partition ID |
|---------|--------------|
| 106:A   | 172:A        |
| 106:A   | 172:B        |
| 106:B   | 172:C        |
| 106:B   | 172:D        |
| —       | —            |
| —       | —            |
| —       | —            |

Figure 3E:
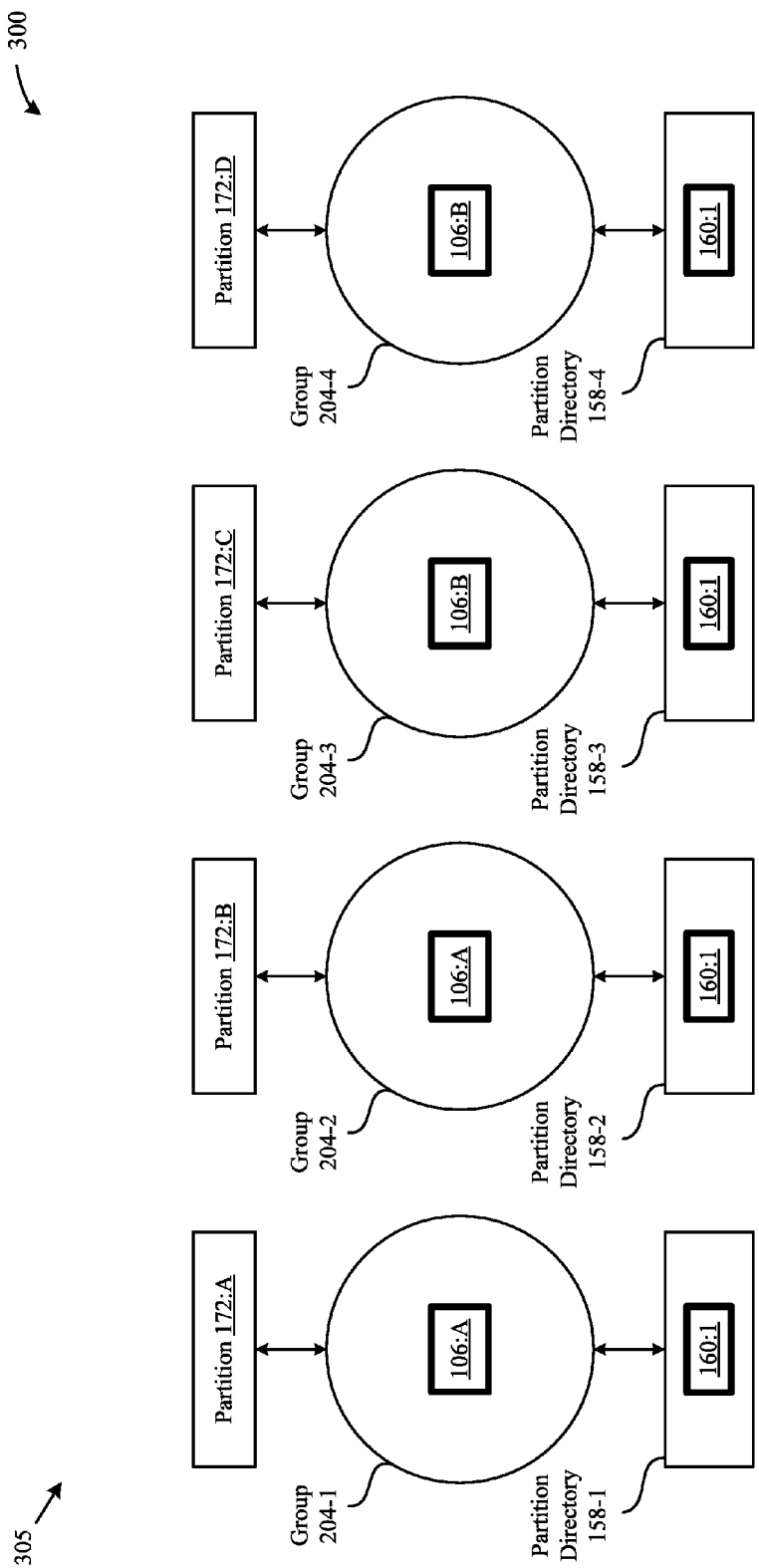
Figure 3F:
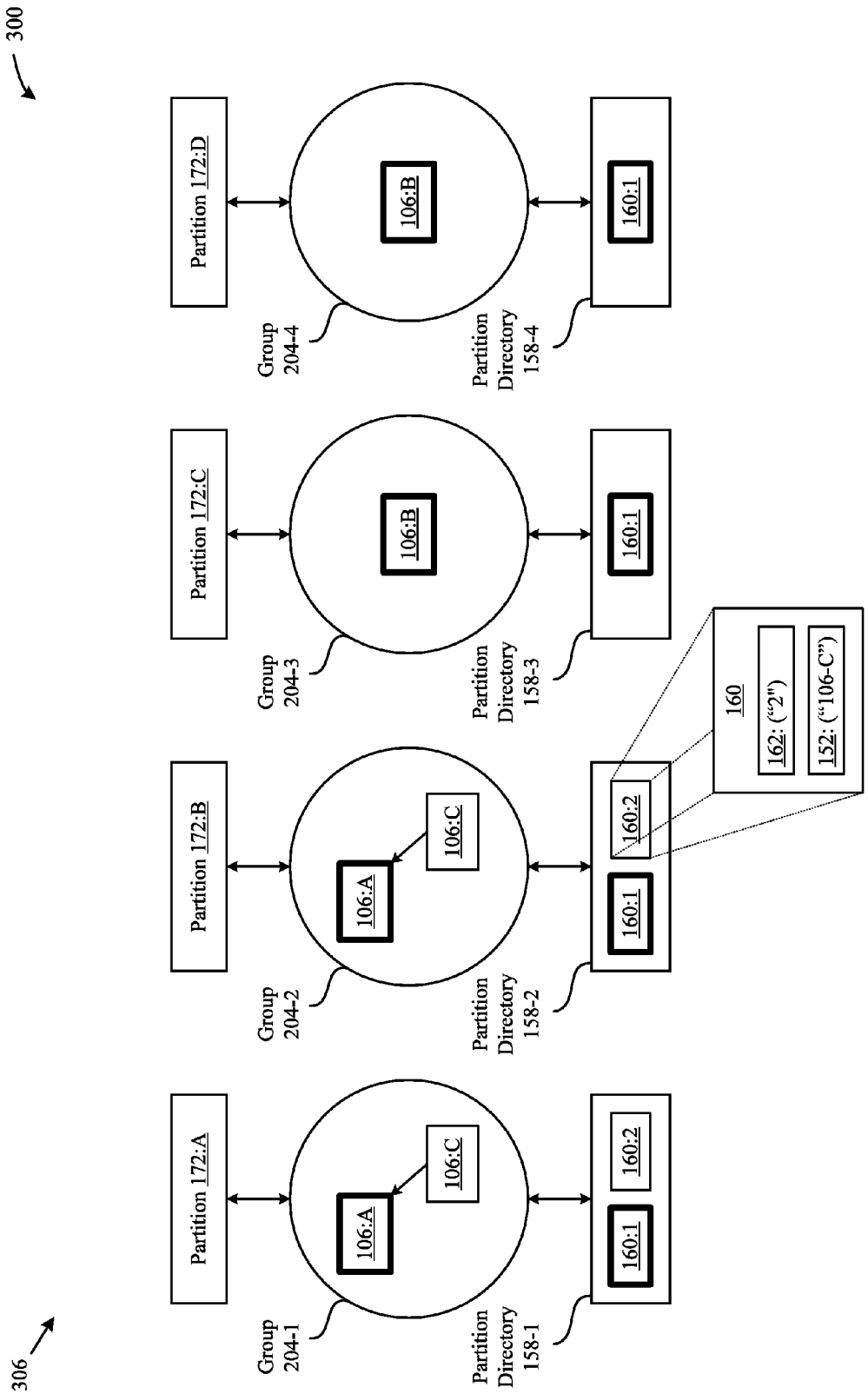

Turning now to FIG. 3E, at step 305, a DbRM 106 with a DbRM ID 152 of "106:C" and a capacity of managing two partitions 172 comes online and detects that the tracker directory 166 includes entries 170 for each and every one of the partitions 172. In response, the DbRM 106 with a DbRM ID 152 of "106:C" sorts the entries 170 by the partition ID 174 to determine the partition 172 that has the fewest number of DbRM 106 candidates. Subsequently, at step 306 in FIG. 3F, the DbRM 106 with an ID of "106:C", in correlation to having a capacity of managing two partitions 172, requests the configuration device 108 to create an ephemeral node 160 within each of the election directories 165-1 and 165-2 that correspond to the groups 204-1 and 204-2, respectively. In this example, the ephemeral nodes 160 include a sequence number 162 of "2" since they are the second ephemeral nodes 160 to be generated within their respective election directories 165-1 and 165-2. Notably, this makes the DbRM 106 with the DbRM ID 152 of "106:C" the candidate manager of the partitions 172:A and 172:B, since the ephemeral nodes 160 are not the earliest-generated nodes within the respective election directories 165-1 and 165-2. Next, the DbRM 106 with the DbRM ID 152 of "106:C" requests the configuration device 108 to update the tracker directory 166 to reflect the creation of the ephemeral nodes 160, which is represented below in Table 4.

TABLE 4

(Tracker Directory 166)

| DbRM ID | Partition ID |
|---------|--------------|
| 106:A   | 172:A        |
| 106:A   | 172:B        |
| 106:B   | 172:C        |

TABLE 4-continued (Tracker Directory 166)

| DbRM ID | Partition ID |
|---------|--------------|
| 106:B   | 172:D        |
| 106:C   | 172:A        |
| 106:C   | 172:B        |
| —       | —            |
| —       | —            |

Figure 3G:
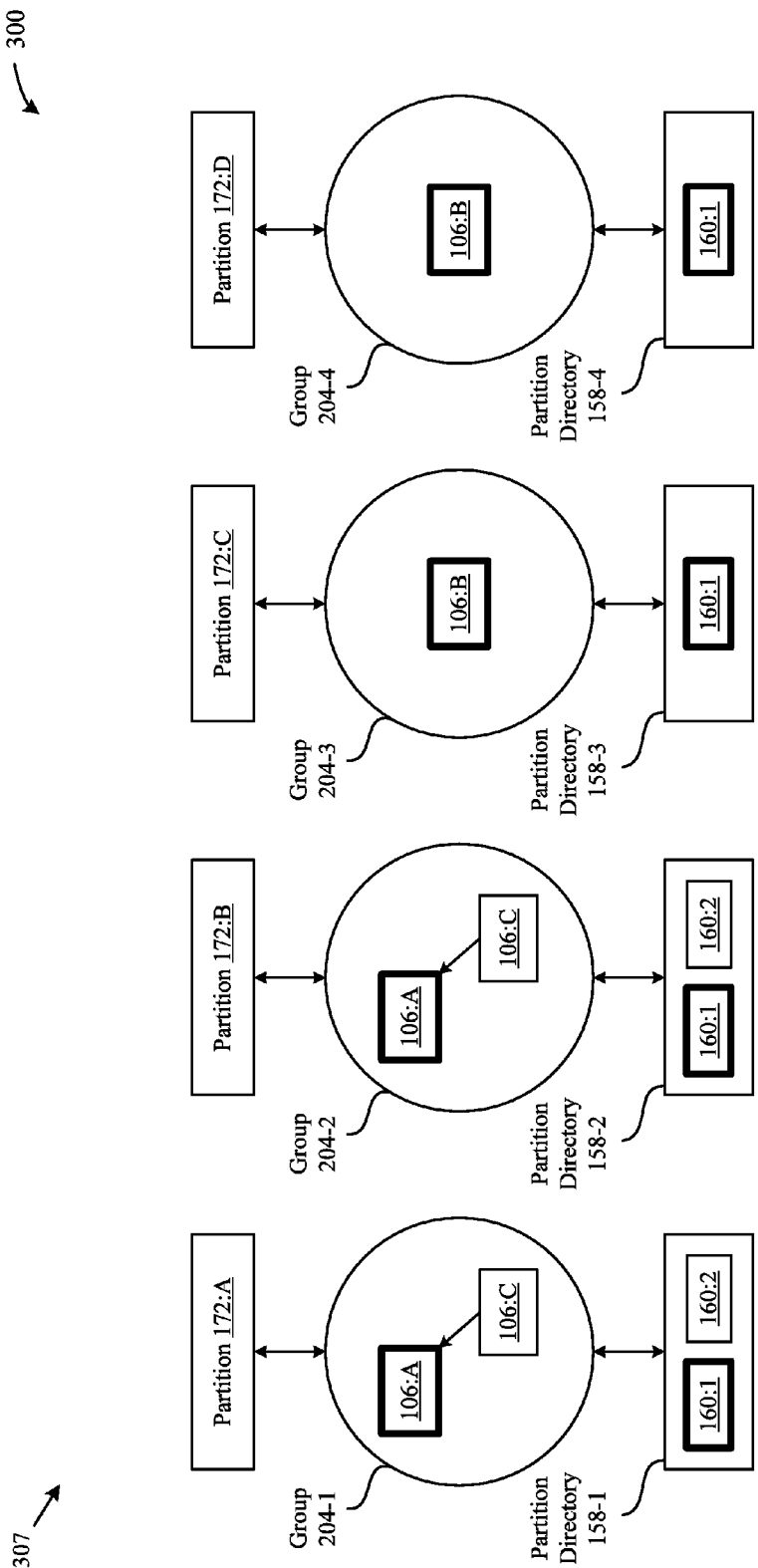

Turning now to FIG. 3G, at step 307, a DbRM 106 with a DbRM ID 152 of "106:D" and a capacity of managing two partitions 172 comes online and detects that the tracker directory 166 includes entries 170 for each and every one of the partitions 172. In turn, the DbRM 106 with a DbRM ID 152 of "106:D" sorts the entries 170 by the partition ID 174 to determine the partition 172 that has the fewest number of DbRM 106 candidates, which is represented below in Table 5.

TABLE 5

(Tracker Directory 166)

| DbRM ID | Partition ID |
|---------|--------------|
| 106:A   | 172:A        |
| 106:C   | 172:A        |
| 106:A   | 172:B        |
| 106:C   | 172:B        |
| 106:B   | 172:C        |
| 106:B   | 172:D        |
| —       | —            |
| —       | —            |

Figure 3H:
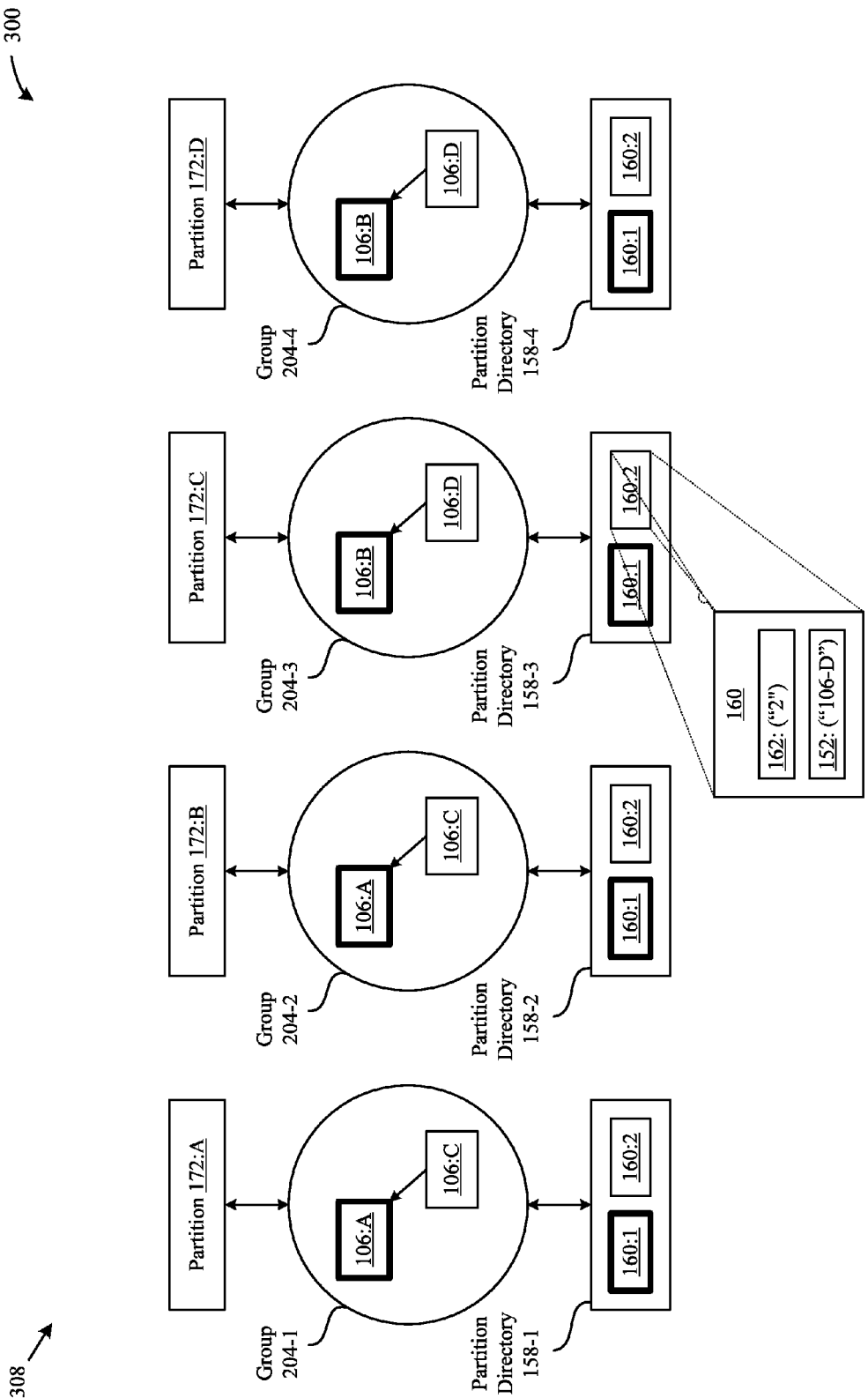

Next, at step 308 in FIG. 3H, the DbRM 106 with a DbRM ID 152 of "106:D", in correlation to having a capacity of managing two partitions 172, requests the configuration device 108 to create an ephemeral node 160 within each of the election directories 165-3 and 165-4 that correspond to the groups 204-3 and 204-4, respectively. In this example, the ephemeral nodes 160 include a sequence number 162 of "2" since they are the second ephemeral nodes 160 to be generated within their respective election directories 165-3 and 165-4. Notably, this makes the DbRM 106 with the DbRM ID 152 of "106:D" the candidate manager of the partitions 172:C and 172:D, since the ephemeral nodes 160 are not the earliest-generated nodes within the respective election directories 165-3 and 165-4. In turn, the DbRM 106 with a DbRM ID 152 of "106:D" requests the configuration device 108 to update the tracker directory 166 to reflect the creation of the ephemeral nodes 160, which is represented below in Table 6.

TABLE 6

(Tracker Directory 166)

| DbRM ID | Partition ID |
|---------|--------------|
| 106:A   | 172:A        |
| 106:C   | 172:A        |
| 106:A   | 172:B        |
| 106:C   | 172:B        |
| 106:B   | 172:C        |
| 106:B   | 172:D        |
| 106:D   | 172:C        |
| 106:D   | 172:D        |

Figure 3I:
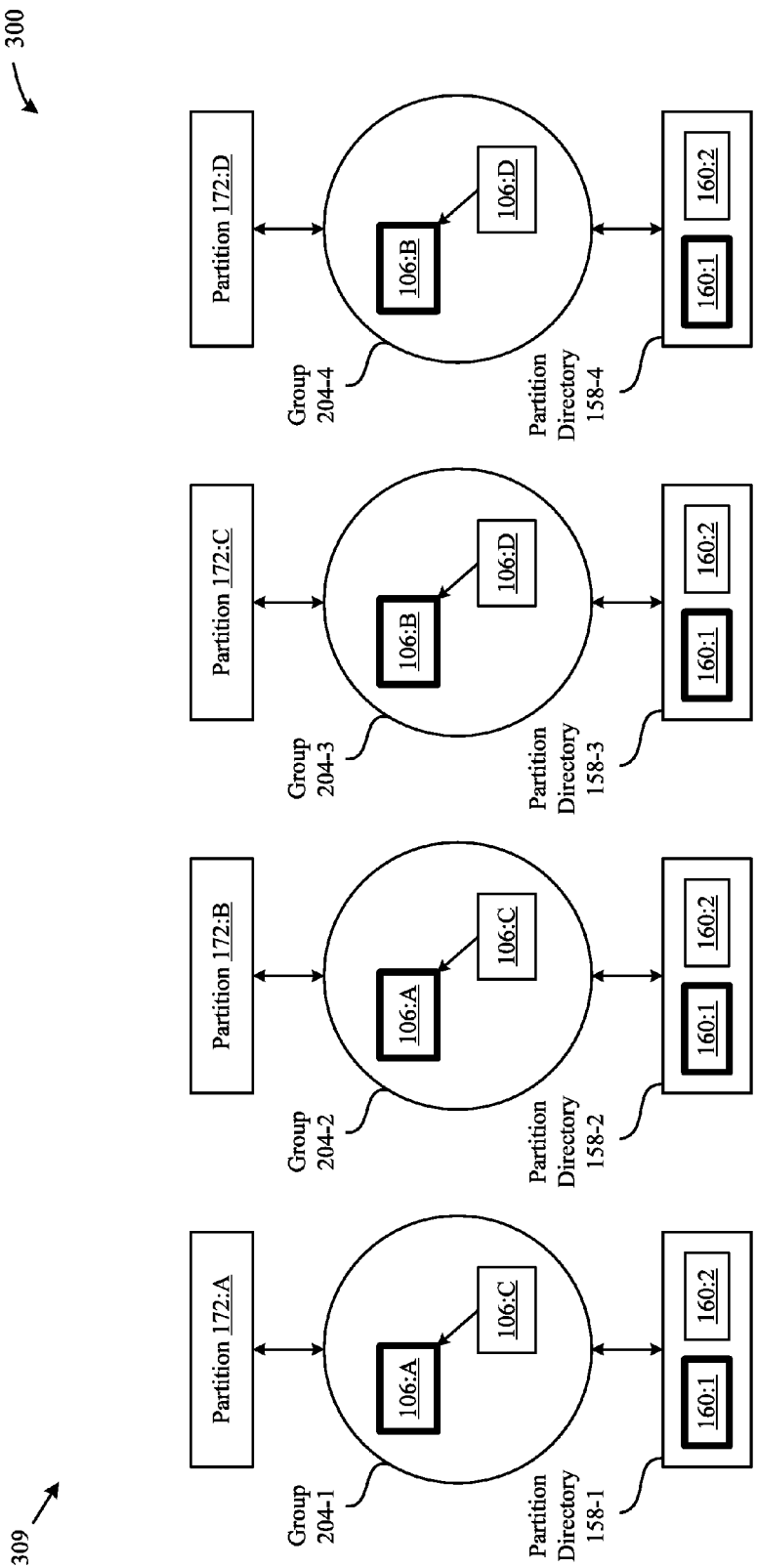

Finally, at step 309 in FIG. 3I, each of the partitions 172 has one DbRM 106 assigned as a master 206 and one DbRM 106 assigned as a candidate 208. According to this configuration, in the event that a master 206 of a partition 172 becomes inactive, the associated candidate 208 immediately becomes the replacement master 206 as deemed by the ephemeral nodes 160 that define the master 206 and candidates 208 associated with the partition 172. For example, if the DbRM 106 with a DbRM ID 152 of "106:A" were to fail, then the DbRM 106 with a DbRM ID 152 of "106:C" would determine that the ephemeral node 160 to which the DbRM 106 with a DbRM ID 152 of "106:C" corresponds is now the earliest-generated node included in the respective election directory 165. In turn, and as described above, the DbRM 106 with a DbRM ID 152 of "106:C" would update the master file 164 included in the respective master directory 163 to store information that enables the servers 105 to directly-access the DbRM 106 with a DbRM ID 152 of "106:C".

Notably, although the conceptual diagrams of FIGS. 3A-3I ends at step 309, those having ordinary skill in the art will understand that the sequence diagram 300 is merely representative of a rudimentary example involving few DbRMs 106 and partitions 172. However, the techniques described herein can be scaled to manage any number of DbRMs 106 and partitions 172. Moreover, although the embodiments are directed toward managing database partitions, those having skill in the art will understand that the techniques described herein can be applied to facilitate management of any kind of hardware resource that requires management, e.g., printers, network-attached storage (NAS), storage area networks (SANs), server devices that provide virtualized computing services, and the like.

Accordingly, FIGS. 1A-1B, 2, and 3A-3I provide an overview of how the different components of the computer system 100 communicate with one another to carry out the various embodiments of the invention. However, to provide additional details, method diagrams are illustrated in FIGS. 4A-4C and 5 and represent the manner in which each of the components is configured to handle the various requests that are passed between one another within the computer system 100.

Figure 4A:
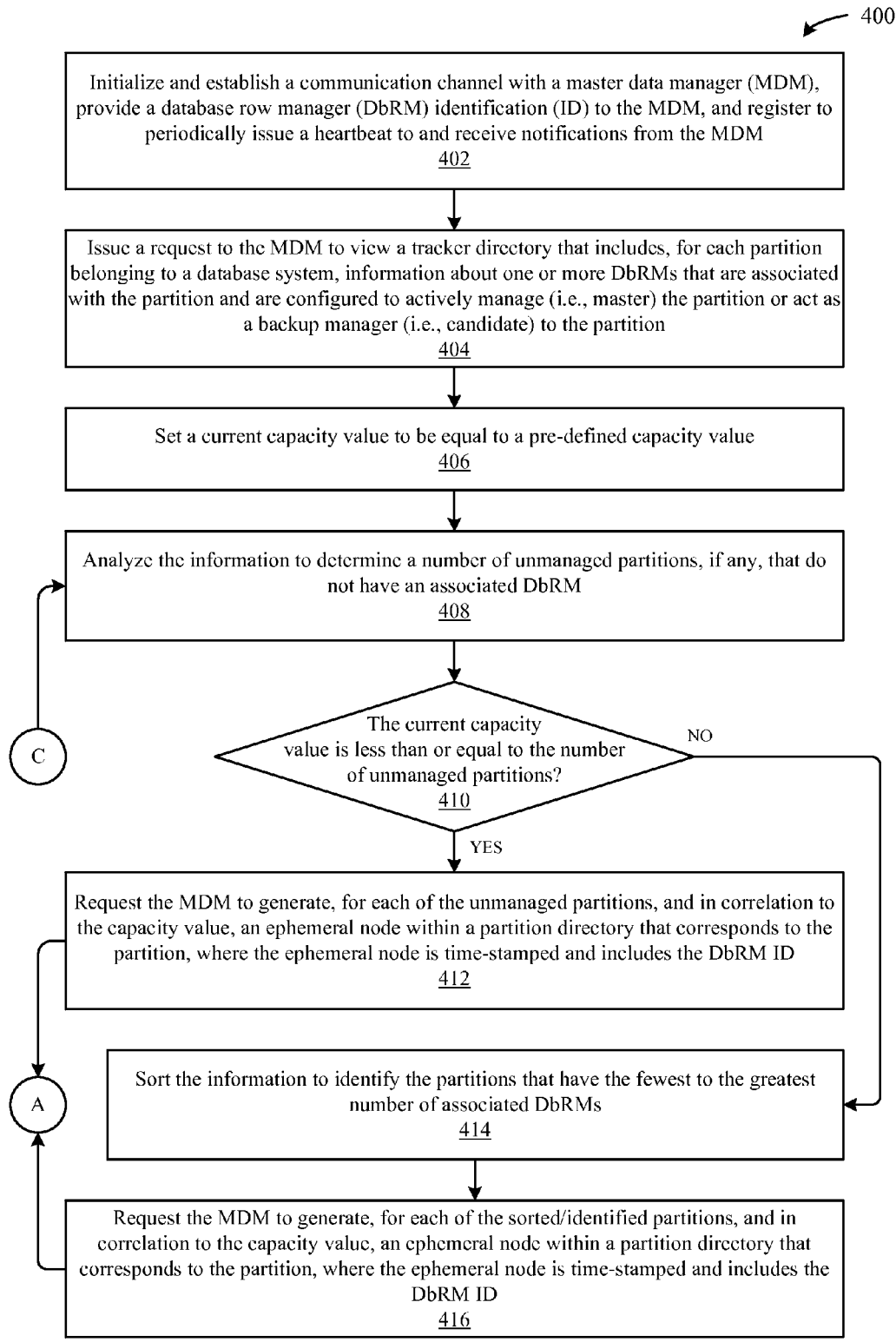
FIGS. 4A-4C illustrate a method executed by a database row manager, according to one embodiment of the invention.
Figure 4B:
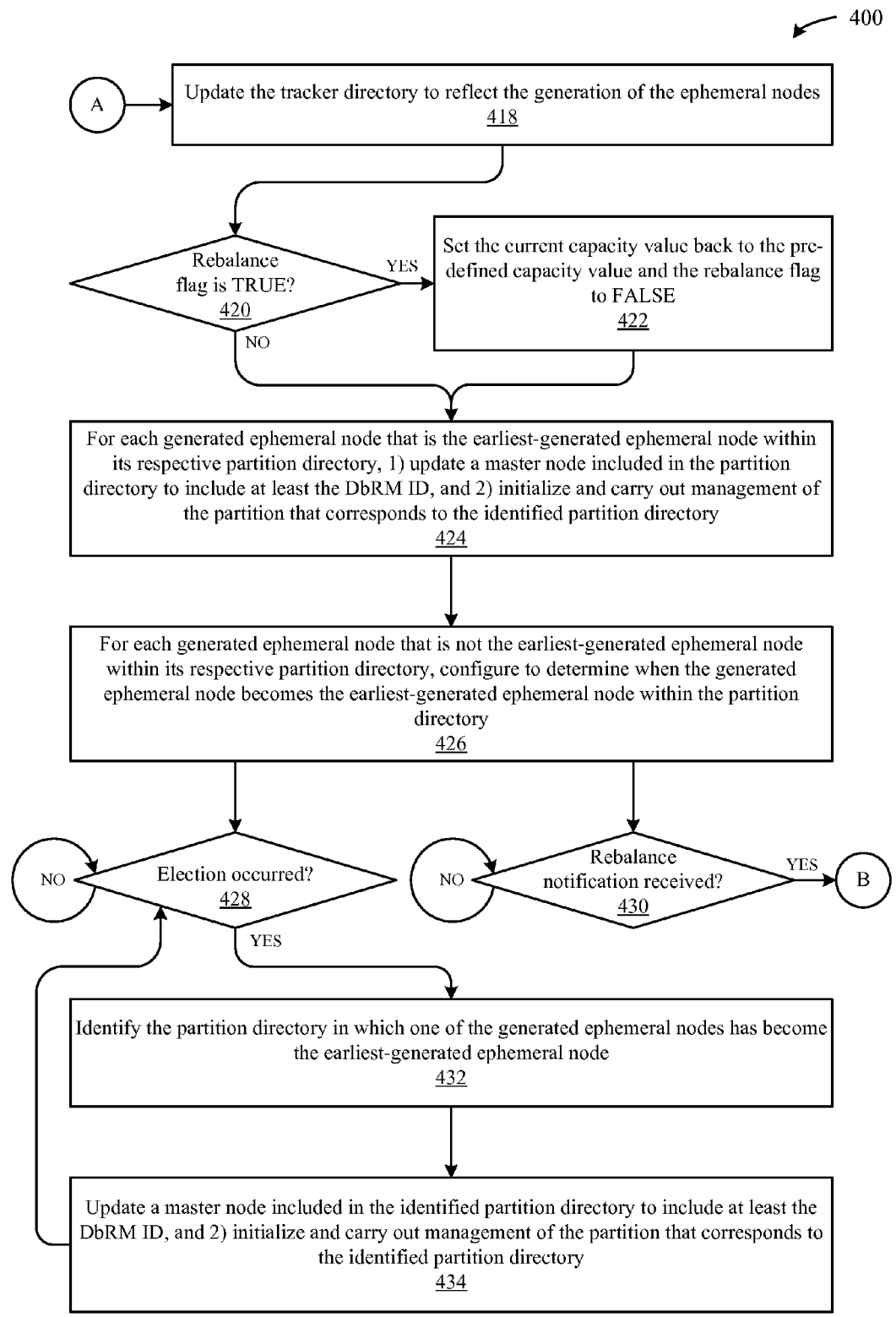
Figure 4C:
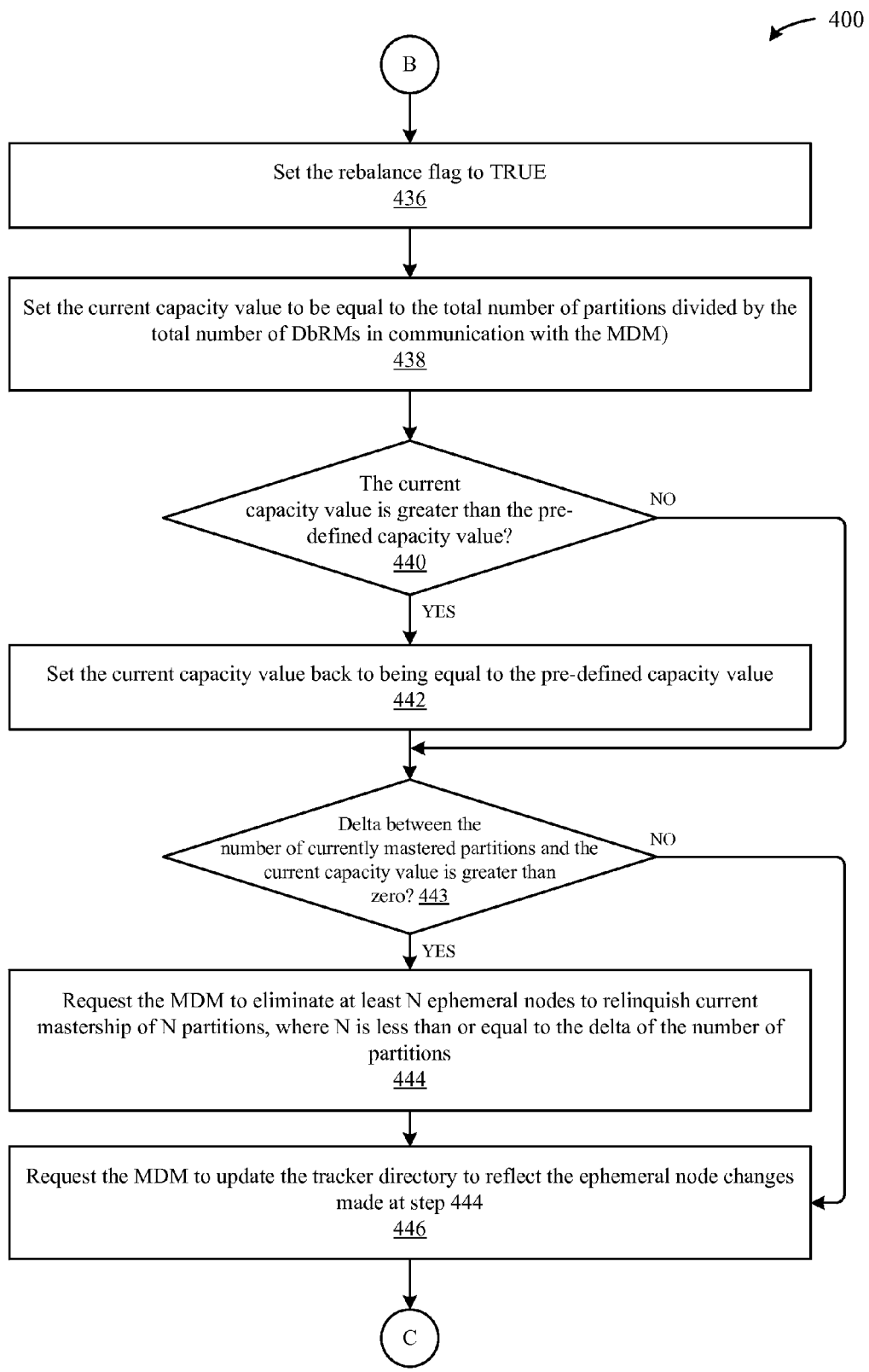

In particular, FIGS. 4A-4C illustrate a method 400 executed by a manager 154 of a DbRM 106, according to one embodiment of the invention. The method 400 includes the details surrounding an initialization of a DbRM 106, the participation of the DbRM 106 in elections involving other DbRMs 106 to manage partitions 172, and the participation of the DbRM 106 during a rebalance of how all DbRMs 106 are configured to manage the partitions 172. As shown, the method 400 begins at step 402, where the manager 154 1) initializes and establishes a communication channel with the MDM 156 (e.g., via a LAN), 2) provides a DbRM ID 152 to the MDM 156, and 3) registers to periodically issue a heartbeat to and receive notifications from the MDM 156.

At step 404, the manager 154 issues a request to the MDM 156 to view the tracker directory 166 that includes, for each partition 172 belonging to the database 114, information about one or more DbRMs 106 that are associated with the partition 172 and are configured to actively manage (i.e., master 206) the partition 172 or act as a backup manager (i.e., candidate 208) to the partition 172. At step 406, the manager 154 sets a current capacity value to be equal to a pre-defined capacity value, e.g., ten partitions. At step 408, the manager 154 analyzes the tracker directory 166 to determine a number of unmanaged partitions 172, if any, that do not yet have an associated DbRM 106.

At step 410, the manager 154 determines whether the current capacity value is less than or equal to the number of unmanaged partitions 172. If, at step 410, the manager 154 determines that the current capacity value is less than or equal to the number of unmanaged partitions 172, then the method 400 proceeds to step 412. Otherwise, the method 400 proceeds to step 414, described below. At step 412, the manager 154 requests the MDM 156 to generate, for each of the unmanaged partitions 172, and in correlation to the capacity value, an ephemeral node 160 within an election directory 165 that corresponds to the partition 172, where the ephemeral node 160 is time-stamped (via the sequence number 162) and includes the DbRM ID 152.

Referring back now to step 410, if the manager 154 determines that the current capacity value is not less than or equal to the number of unmanaged partitions 172, then the method 400 proceeds to step 414, where the manager 154 sorts the information to identify the partitions 172 that have the fewest to the greatest number of associated DbRMs 106. At step 416, the manager 154 requests the MDM 156 to generate, for each of the sorted/identified partitions 172, and in correlation to the capacity value, an ephemeral node 160 within the election directory 165 of the partition directory 158 that corresponds to the partition 172, where the ephemeral node 160 is time-stamped and includes the DbRM ID 152.

In an alternative approach, step 416 can involve the manager 154 using randomness when requesting the MDM 156 to generate the ephemeral nodes within election directories 165, which can help effect a more even spread of management responsibilities between the DbRMs 106. More specifically, the alternative approach for step 416 involves the manager 154 grouping partitions 172 that share the same number of DbRMs 106 that have been assigned as master/candidate managers. Next, the manager 154 starts with the first group of partitions 172 that share the fewest number of DbRMs 106 that have been assigned as master/candidate managers, and, in correlation to the capacity value of the manager 154, selects at random the election directories 165 in which to request the MDM 156 to generate an ephemeral node 160. If, after dedicating capacity to the first group of partitions 172, the manager 154 is left with additional management capacity, the manager 154 moves to the next group of partitions 172 and repeats the random distribution process as with the first group of partitions 172. The manager 154 repeats this process for each group of partitions 172 until the capacity of the manager 154 is exhausted.

It is noted that this alternative approach helps avoid lopsided distribution of responsibilities that would otherwise occur, for example, if two DbRMs 106 come online at the same time and a sequential assignment approach is implemented. More specifically, if the two DbRMs receive the same sorted list of partitions 172, and each of the two DbRMs 106 sequentially—instead of randomly—assign themselves as master/candidate managers to each of the partitions 172 based on their capacity values, then the management spread across the partitions 172 would largely bias the partitions 172 that are positioned higher in the sorted list. This would be especially detrimental, for example, if each of the two DbRMs 106 has a capacity to manage two partitions, and there exists ten partitions 172 to which no master manager/candidate managers are assigned. In this example, each of the two DbRMs 106 would come online at the same time and target the same first two partitions 172 included in the sorted list, which would result in two partitions 172 each having one master manager and one candidate manager, with eight partitions 172 having no manager at all. In contrast, and as set forth above, the randomness-based approach would likely lead to a more even distribution of management responsibilities, i.e., four partitions 172 would each have a master manager, and the remaining six partitions 172 would be assigned a master as additional DbRMs 106 come online.

At step 418, the manager 154 updates the tracker directory 166 to reflect the ephemeral nodes 160 that were generated in either step 412 or 414. As previously described herein, updating the tracker directory 166 involves adding entries 170 that include data that is specific to both the DbRM ID 152 as well as the partition ID 174 of the partitions 172 that correspond to the partition directories 158 in which the ephemeral nodes 160 are included.

At step 420, the manager 154 determines whether a rebalance flag is TRUE, which, as described in greater detail below, can be set as TRUE at step 436. If, at step 420, the manager 154 determines that rebalance flag is TRUE, then the method 400 proceeds to step 422, where the manager 154 sets the current capacity value back to the pre-defined capacity value and the rebalance flag to FALSE, which constitutes a follow-up procedure in association with the method steps 436-448 described below in greater detail. Otherwise, the method 400 proceeds to step 424.

At step 424, the manager 154, for, each generated ephemeral node 160 that is the earliest-generated ephemeral node 160 within its respective partition directory 158, 1) updates a master file 164 included in the partition directory 158 to include at least the DbRM ID 152, and 2) initializes and carries out management of the partition 172 that corresponds to the identified partition directory 158. As previously described herein, carrying out the management of the partition 172 involves receiving requests 103 from servers 105—which monitor the configuration of the DbRMs 106—and translating the requests 103 into I/O requests 107 that are understood by the database 114.

At step 426, the manager 154, for, each generated ephemeral node 160 that is not the earliest-generated ephemeral node 160 within its respective partition directory 158, configures itself to determine when the generated ephemeral node 160 becomes the earliest-generated ephemeral node 160 within the partition directory 158. In this way, the DbRM 106 executing the manager 154 acts as a candidate 208 to the partitions 172 mentioned at step 426, and is capable of transitioning to acting as a master manager of one or more of the partitions 172.

Thus, at step 426, the manager 154 is: 1) managing the partitions 172 to which it is assigned as a master manager, 2) configured to determine when an ephemeral node 160 associated with the manager 154 becomes the earliest-generated ephemeral node 160 within a partition directory 158, and 3) configured to respond to rebalance notifications issued by the configuration device 108. As described in greater detail below throughout steps 428-434, the manager 154, when elected as a master manager to a partition 172, is configured to take the appropriate steps to become the master manager to the partition 172. Moreover, and as described in greater detail below throughout steps 436-446, the manager 154, upon receipt of a rebalance notification, is configured to perform a rebalance technique.

At step 428, the manager 154 determines whether an election has occurred (i.e., the manager 154 determines that a corresponding ephemeral node 160 has become the earliest-generated ephemeral node 160 within a particular partition directory 158). If, at step 428, the manager 154 determines that an election has occurred, then the method 400 proceeds to step 432. Otherwise, the method 400 proceeds back to step 428, and the manager 154 continues to wait at step 428 (as well as step 430) until an election has occurred.

In the event that an election occurs, at step 432, the manager 154 identifies the partition directory 158 in which one of the generated ephemeral nodes 160 has become the earliest-generated ephemeral node 160. At step 434, the manager 154 updates the master file 164 included in the identified partition directory 158 to: 1) include at least the DbRM ID 152, and 2) initializes and carries out management of the partition 172 that corresponds to the identified partition directory 158.

Referring back now to step 430, the manager 154 determines whether a rebalance notification is received. If, at step 430, the manager 154 determines that rebalance notification is received, then the method 400 proceeds to step 436. Otherwise, the method 400 proceeds back to step 430, and the manager 154 continues to wait at step 430 (as well as step 428) until a rebalance notification is received.

At step 436, the manager 154 sets the rebalance flag to TRUE. At step 438, the manager 154 sets the current capacity value to be equal to the total number of partitions directories 158 divided by the total number of DbRMs 106 in communication with the MDM 156. At step 440, the manager 154 determines whether the current capacity value is greater than the pre-defined capacity value. If, at step 440, the manager 154 determines that the current capacity value is greater than the pre-defined capacity value, then the method 400 proceeds to step 442, where the manager 154 sets the current capacity value back to being equal to the pre-defined capacity value, since the manager 154 should not attempt to manage a number of partitions 172 that exceeds the pre-defined capacity value.

At step 443, the manager 154 determines if the delta between the number of currently mastered partitions and the current capacity value is greater than zero, and, if so, the method 400 proceeds to step 444; otherwise, the method proceeds to step 446. At step 444, the manager 154 requests the MDM 156 to eliminate at least N ephemeral nodes to relinquish current mastership of N partitions, where N is less than or equal to the delta of the number of partitions determined at step 443. At step 446, the manager 154 requests the MDM 156 to update the tracker directory 166 to reflect the elimination of the ephemeral nodes 160 made at step 444. Next, the method 400 returns to step 408, whereupon the subsequent method steps 400 are executed according to the techniques described above, thereby causing the rebalance to occur.

Figure 5:
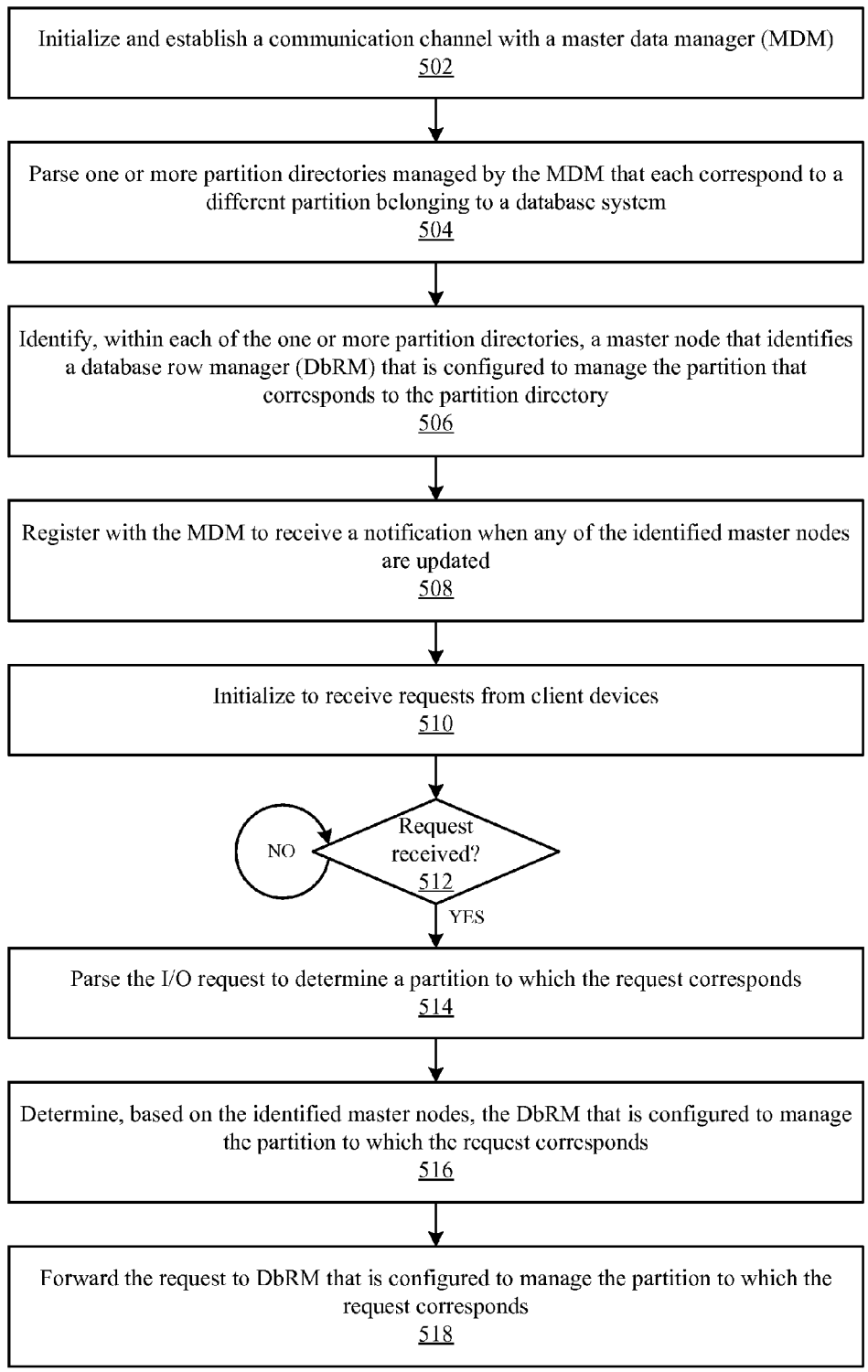
FIG. 5 illustrates a method executed by a server configured to act as an interface between client devices and database row managers, according to one embodiment of the invention.

FIG. 5 illustrates a method 500 executed by a manager 157 of a server 105, according to one embodiment of the invention. As shown, the method 500 begins at step 502, where the manager 157 initializes and establishes a communication channel with the MDM 156. At step 504, the manager 157 parses one or more partition directories 158 managed by the MDM 156 that each correspond to a different partition 172.

At step 506, the manager 157 identifies, within each of the one or more partition directories 158, a master file 164 that identifies a DbRM 106 that is configured to manage the partition 172 that corresponds to the partition directory 158. At step 508, the manager 157 registers with the MDM 156 to receive a notification when any of the identified master files 164 are updated.

At step 510, the manager 157 initializes to receive requests 103 from client devices 102. At step 512, the manager 157 determines whether a request 103 is received. If, at step 512, the manager 157 determines that a request 103 is received, then the method 500 proceeds to step 514. Otherwise, the method 500 proceeds back to step 514, where the manager 157 waits until a request 103 is received from a client device 102.

If, at step 512, the manager 157 determines that a request 103 is received, then at step 514, the manager 157 parses the request 103 to determine a partition 172 to which the request 103 corresponds. At step 516, the manager 157 determines, based on the identified master files 164, the DbRM 106 that is configured to manage the partition 172 to which the request 103 corresponds. At step 518, the manager 157 forwards the request 103 to DbRM 106 that is configured to manage the partition 172 to which the request corresponds.

Although not illustrated in FIG. 5, the forwarded request 103 is handled by the DbRM 106 and the database 114 according to the techniques described herein. The DbRM 106 reports the result of the request 103 back to the manager 157, whereupon the manager 157 relays the appropriate response to the client device 102 that issued the request 103.

Figure 6:
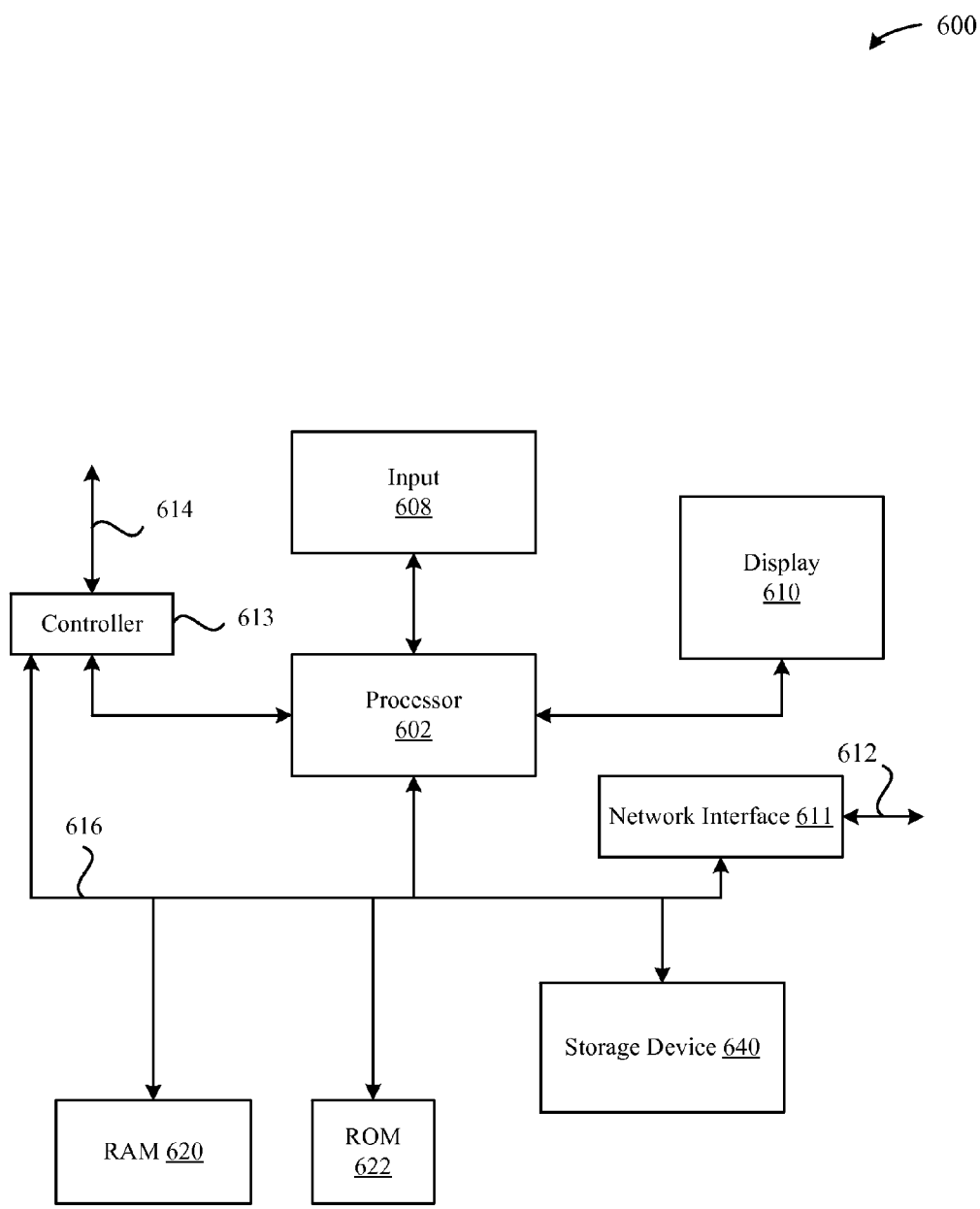
FIG. 6 illustrates a detailed view of a computing device that can be used to implement the various computing devices described herein, according to one embodiment of the invention.

FIG. 6 is a block diagram of a computing device 600 that can represent the components of a client device 102, a server 105, a database row manager 106, or a configuration device 108. As shown in FIG. 6, the computing device 600 can include a processor 602 that represents a microprocessor or controller for controlling the overall operation of computing device 600. The computing device 600 can also include user input device 608 that allows a user of the computing device 600 to interact with the computing device 600. For example, user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by processor 602 to display information to the user. Data bus 616 can facilitate data transfer between at least storage devices 640, processor 602, and controller 613. Controller 613 can be used to interface with and control different equipment through equipment control bus 614. The computing device 600 can also include a network/bus interface 611 that couples to data link 612. Data link 612 can allow the computing device 600 to couple to a host computer or to accessory devices. The data link 612 can be provided over a wired connection or a wireless connection. In the case of a wireless connection, network/bus interface 611 can include a wireless transceiver.

The computing device 600 also include a storage device 640, which can comprise a single disk or a plurality of disks (e.g., hard drives), and includes a storage management module that manages one or more partitions (also referred to herein as "logical volumes") within the storage device 640. In some embodiments, storage device 640 can include flash memory, semiconductor (solid state) memory or the like. The computing device 600 can also include Random Access Memory (RAM) 620 and Read-Only Memory (ROM) 622. The ROM 622 can store programs, utilities or processes to be executed in a non-volatile manner. The RAM 620 can provide volatile data storage, and stores instructions related to components of the storage management module that are configured to carry out the various techniques described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for registering to manage resources, the method comprising:
   during an initialization, identifying a capability to simultaneously manage a maximum number of resources;
   identifying the resources that have a fewest number of assigned managers;
   based on the maximum number, registering to manage each resource by creating a node object within a resource directory that corresponds to the resource, wherein the node object includes data that indicates both a sequence at which the node object is created and a server that created the node object, such that the registration to manage the resource results in either i) actively managing the resource, or ii) acting as a backup manager to the resource; and
   for each registration that results in actively managing a resource:
   updating a configuration to receive and process client device requests that are directed to utilizing the resource.

2. The method of claim 1, wherein identifying the resources includes parsing data included in a tracker directory, and the method further comprises:
   updating the tracker directory to reflect each registration.

3. The method of claim 2, wherein the tracker directory includes data pair entries, and each data pair entry identifies a server that is assigned to manage the resource either actively or as a backup.

4. The method of claim 2, further comprising:
   receiving an indication to perform a rebalance;
   clearing all existing registrations to manage resources, and reflecting the clearing within tracker directory;
   generating a temporary capacity value based on a total number of the resources divided by a total number of servers available to manage the resources;
   parsing data included in the tracker directory to identify the resources that have a fewest number of servers assigned to manage them;
   based on the temporary capacity value, registering to manage the resources, wherein each registration to manage an identified resource results in:
   i) actively managing the identified resource when no other server is registered to manage the identified resource, or
   ii) acting as the backup manager to the identified resource when at least one other server is registered to manage the identified resource;
   updating the tracker directory to reflect each registration; and
   for each registration that results in actively managing the identified resource:
   configuring to receive and process client device requests that are directed to utilizing the identified resource.

5. The method of claim 1, wherein registering configuring includes updating a master file included in a resource directory to which the resource corresponds, and the master file includes information that enables the client device requests to be properly routed.

6. The method of claim 1, further comprising:
   periodically issuing a heartbeat to a configuration device to indicate aliveness to the configuration device.

7. The method of claim 6, wherein, when the heartbeat is not received by the configuration device for a threshold amount of time, the configuration device removes the node objects created in conjunction with the registrations.

8. The method of claim 7, further comprising:
   receiving from the configuration device an indication that a transition should be made from acting as the backup manager to the resource to actively managing the resource.

9. The method of claim 8, wherein the configuration device provides the indication when a server that is assigned to actively manage the resource fails to issue the heartbeat beyond the threshold amount of time.

10. The method of claim 9, wherein the node object created by the server that is assigned to actively manage the resource was created immediately prior to the node object created during the registration that resulted in acting as the backup manager to the resource.

11. The method of claim 1, wherein the resource is a database partition.

12. A method for managing resource requests received from client devices, the method comprising:
    parsing a plurality of resource directories, wherein each resource directory includes a master file that indicates a server that is configured to actively manage a resource to which the resource directory corresponds;
    storing information about the server indicated by each master file;
    receiving a resource request from a client device, wherein the resource request indicates a particular resource and a utilization of the resource;
    referencing the information to identify the server that is configured to actively manage the particular resource indicated by the resource request; and
    forwarding the resource request to the identified server for processing.

13. The method of claim 12, further comprising:
    receiving an indication that the master file has been updated; and
    updating the information to reflect the master file update.

14. The method of claim 12, further comprising:
    receiving, in response to the resource request, a processing result, wherein the processing result indicates an outcome of how the resource request was handled.

15. The method of claim 14, further comprising:
    indicating to the client device the processing result.

16. The method of claim 12, wherein the resource directories are managed by a configuration device that is not accessible to the client devices.

17. The method of claim 12, wherein the server is not directly-accessible to the client devices.

18. A non-transitory computer readable storage medium storing instructions that, when executed by a processor, cause the processor to implement a method for assigning a server to manage resources, the method comprising:

during an initialization of the server, identifying a capacity value that represents a maximum number of resources that can be simultaneously managed;

parsing data included in a tracker directory to identify the resources that have a fewest number of servers assigned to manage them;

based on the capacity value, registering to manage each resource by creating a node object within a resource directory that corresponds to the resource, wherein the node object includes data that indicates both a sequence at which the node object is created and the server that created the node object, such that the registration to manage the resource results in either i) actively managing the resource, or ii) acting as a backup manager to the resource;

updating the tracker directory to reflect the registrations; and for each registration that results in actively managing an identified resource, configuring to receive and process client device requests that are directed to utilizing the identified resource.

19. The non-transitory computer readable storage medium of claim 18, wherein the tracker directory includes data pair entries, and each data pair entry identifies the server that is assigned to manage the identified resource, either actively or as a backup.

20. The non-transitory computer readable storage medium of claim 18, wherein registering further includes updating a master file included in a resource directory to which the resource corresponds, the master file including information that enables the client device requests to be properly routed.

21. A non-transitory computer readable storage medium storing instructions that, when executed by a processor, cause the processor to implement a method for managing resource requests received from client devices, the method comprising:

parsing a plurality of resource directories, wherein each resource directory includes a master file that indicates a server that is configured to actively manage a resource to which the resource directory corresponds;

storing information about the server indicated by each master file;

receiving a resource request from a client device, wherein the resource request indicates a particular resource and a utilization of the resource;

referencing the information to identify the server that is configured to actively manage the particular resource indicated by the resource request; and forwarding the resource request to the identified server for processing.

22. The non-transitory computer readable storage medium of claim 21, further comprising:

receiving an indication that a master file has been updated; and updating the information to reflect the updated master file.

23. The non-transitory computer readable storage medium of claim 21, further comprising receiving, in response to the resource request, a processing result, wherein the processing result indicates an outcome of how the resource request was handled.

24. A computing system, comprising:

a configuration server;

a database comprising a plurality of partitions; and a plurality of servers configured to manage the plurality of partitions, wherein each server is configured to:

during an initialization, identify a capacity value that represents a maximum number of partitions that can be simultaneously managed;

parse data included in a tracker directory to identify the partitions that have a fewest number of servers assigned to manage them;

based on the capacity value, registering to manage each partition by creating a node object within a partition directory that corresponds to the partition, wherein the node object includes data that indicates both a sequence at which the node object is created and a server that created the node object, such that the registration to manage the partition results in either i) actively managing the partition, or ii) acting as a backup manager to the partition;

update the tracker directory to reflect the registrations; and for each registration that results in actively managing an identified partition:

configure to receive and process requests that are directed to utilizing the identified partition.

25. The computing system of claim 24, wherein the tracker directory includes data pair entries, and each data pair entry identifies the server that is assigned to manage a partition, either actively or as a backup.

26. The computing system of claim 24, wherein registering further includes updating a master file included in a partition directory to which the identified partition corresponds, the master file including information that enables client device requests to be properly routed.

* * * * *